United States Patent
Kobayashi et al.

(10) Patent No.: US 12,112,185 B2
(45) Date of Patent: Oct. 8, 2024

(54) COMMUNICATION APPARATUS, COMMUNICATION SYSTEM, NOTIFICATION METHOD, AND COMPUTER PROGRAM PRODUCT

(71) Applicant: KABUSHIKI KAISHA TOSHIBA, Tokyo (JP)

(72) Inventors: Yuta Kobayashi, Ota (JP); Takahiro Yamaura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 460 days.

(21) Appl. No.: 17/412,701

(22) Filed: Aug. 26, 2021

(65) Prior Publication Data

US 2022/0237009 A1    Jul. 28, 2022

(30) Foreign Application Priority Data

Jan. 22, 2021  (JP) ................................. 2021-008477

(51) Int. Cl.
*G06F 9/455* (2018.01)

(52) U.S. Cl.
CPC ........ *G06F 9/4555* (2013.01); *G06F 9/45558* (2013.01); *G06F 2009/45579* (2013.01); *G06F 2009/45595* (2013.01)

(58) Field of Classification Search
CPC .............. G06F 9/4555; G06F 9/45558; G06F 2009/45579; G06F 2009/45595
See application file for complete search history.

(56) References Cited

U.S. PATENT DOCUMENTS

| | | | |
|---|---|---|---|
| 5,535,418 A | 7/1996 | Suzuki | |
| 10,884,786 B2 | 1/2021 | Kobayashi et al. | |
| 11,018,986 B2 | 5/2021 | Yamaura et al. | |
| 2011/0047544 A1* | 2/2011 | Yehuda | G06F 9/4555 718/1 |
| 2012/0291027 A1* | 11/2012 | Chiang | G06F 9/4812 718/1 |
| 2014/0115575 A1* | 4/2014 | Chand | G06F 9/45558 718/1 |
| 2017/0078458 A1* | 3/2017 | Ishihara | H04L 69/161 |
| 2019/0087245 A1* | 3/2019 | Yamaura | G06F 13/122 |

(Continued)

FOREIGN PATENT DOCUMENTS

| | | |
|---|---|---|
| JP | 6-19823 A | 1/1994 |
| JP | 2001-216170 A | 8/2001 |

(Continued)

OTHER PUBLICATIONS

Abderrahmane Benbachir, Hypertracing: Tracing Through Virtualization Layers, (Oct. 8, 2018) (Year: 2018).*

*Primary Examiner* — Dong U Kim
(74) *Attorney, Agent, or Firm* — Oblon, McClelland, Maier & Neustadt, L.L.P.

(57) ABSTRACT

According to an embodiment, a communication apparatus includes a task and a notification unit. The task stores, in a storage unit, notification information to be notified to a virtual machine as a notification destination via a virtual machine monitor after execution of predetermined processing. The notification unit collectively notifies the virtual machine monitor of a plurality of pieces of notification information stored in the storage unit.

11 Claims, 20 Drawing Sheets

(56) References Cited

U.S. PATENT DOCUMENTS

2021/0149603 A1     5/2021   Kobayashi et al.
2021/0152635 A1     5/2021   Kobayashi et al.

FOREIGN PATENT DOCUMENTS

| | | |
|---|---|---|
| JP | 2006-268092 A | 10/2006 |
| JP | 2007-323256 A | 12/2007 |
| JP | 2011-70526 A | 4/2011 |
| JP | 2017-184071 A | 10/2017 |
| JP | 2018-133758 A | 8/2018 |
| JP | 2019-53591 A | 4/2019 |
| JP | 2019-57817 A | 4/2019 |
| JP | 2020-48045 A | 3/2020 |
| WO | WO 2014/141854 A1 | 9/2014 |

\* cited by examiner

FIG.10A

| ID | task |
|---|---|
| 1 | br_in (pif) |
| 2 | br_out (pif) |
| 3 | br_in (vif1) |
| 4 | br_out (vif1) |
| 5 | br_in (vif2) |
| 6 | br_out (vif2) |
| 7 | br_in (vif3) |
| 8 | br_out (vif3) |
| 9 | fdb_clean |
| 10 | stat_update | next_task → 5

FIG.10B

| ID | task | arg |
|---|---|---|
| 1 | br_in | pif |
| 2 | br_out | pif |
| 3 | br_in | vif1 |
| 4 | br_out | vif1 |
| 5 | br_in | vif2 |
| 6 | br_out | vif2 |
| 7 | br_in | vif3 |
| 8 | br_out | vif3 |
| 9 | fdb_clean | - |
| 10 | stat_update | - | next_task → 5

FIG.14

| TYPE OF hypercall | NOTIFICATION DESTINATION VIRTUAL MACHINE | info |
|---|---|---|
| EVENT NOTIFICATION | VM1 | READ COMPLETION NOTIFICATION |
| EVENT NOTIFICATION | VM1 | WRITE COMPLETION NOTIFICATION |
| EVENT NOTIFICATION | VM2 | READ COMPLETION NOTIFICATION |
| EVENT NOTIFICATION | VM3 | READ COMPLETION NOTIFICATION |
| EVENT NOTIFICATION | VM4 | WRITE COMPLETION NOTIFICATION |
| MEMORY PROCESSING | VM1 | setup, MEMORY ADDRESS, ACCESS RESTRICTION (Read Only) |
| MEMORY PROCESSING | VM3 | map, MEMORY ADDRESS, IDENTIFIER |
| CONSOLE OUTPUT | VM0 | OUTPUT CHARACTER STRING |
| CONSOLE OUTPUT | VM1 | INPUT CHARACTER STRING |

FIG.15

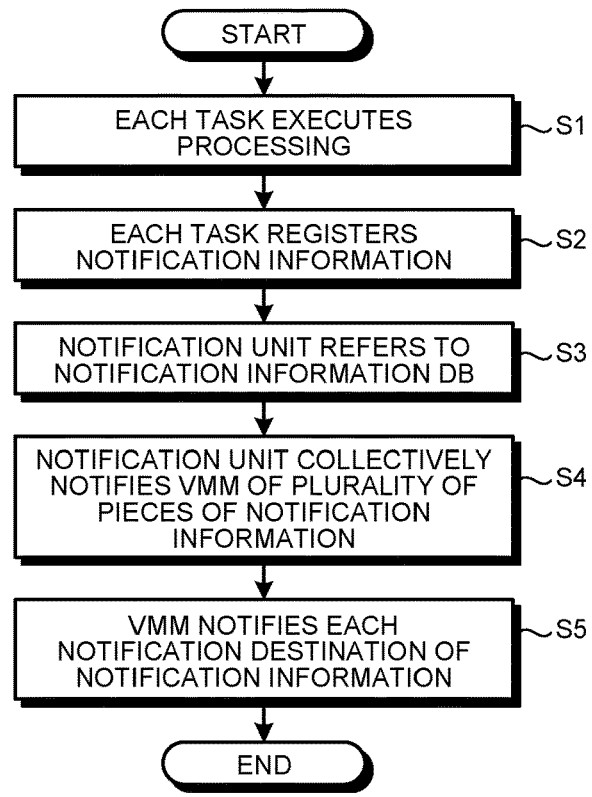

COMMUNICATION APPARATUS, COMMUNICATION SYSTEM, NOTIFICATION METHOD, AND COMPUTER PROGRAM PRODUCT

CROSS-REFERENCE TO RELATED APPLICATIONS

This application is based upon and claims the benefit of priority from Japanese Patent Application No. 2021-008477, filed on Jan. 22, 2021; the entire contents of which are incorporated herein by reference.

FIELD

Embodiments described herein relate generally to a communication apparatus, a communication system, a notification method, and a computer program product.

BACKGROUND

Real-time performance is required in fields such as an industrial network that connects devices in a factory and an in-vehicle network that connects a controller of an in-vehicle system. In recent years, Ethernet (registered trademark) has been increasingly used in the industrial network and the in-vehicle network, and various real-time Ethernet standards have been proposed. Further, a virtual computer technology has been applied to industrial systems and in-vehicle systems. By consolidating multiple virtual machines on one physical computer, cost reduction and other effects can be expected. Against such a background, a software switch for communication processing between virtual machines is also required to support real-time Ethernet.

BRIEF DESCRIPTION OF THE DRAWINGS

FIG. 10A is a diagram illustrating a first example of task schedule information according to the first embodiment;

FIG. 10B is a diagram illustrating a second example of the task schedule information according to the first embodiment;

FIG. 14 is a diagram illustrating an example of notification information according to the first embodiment;

FIG. 15 is a flowchart illustrating an example of a notification method according to the first embodiment;

DETAILED DESCRIPTION

Figure 1:
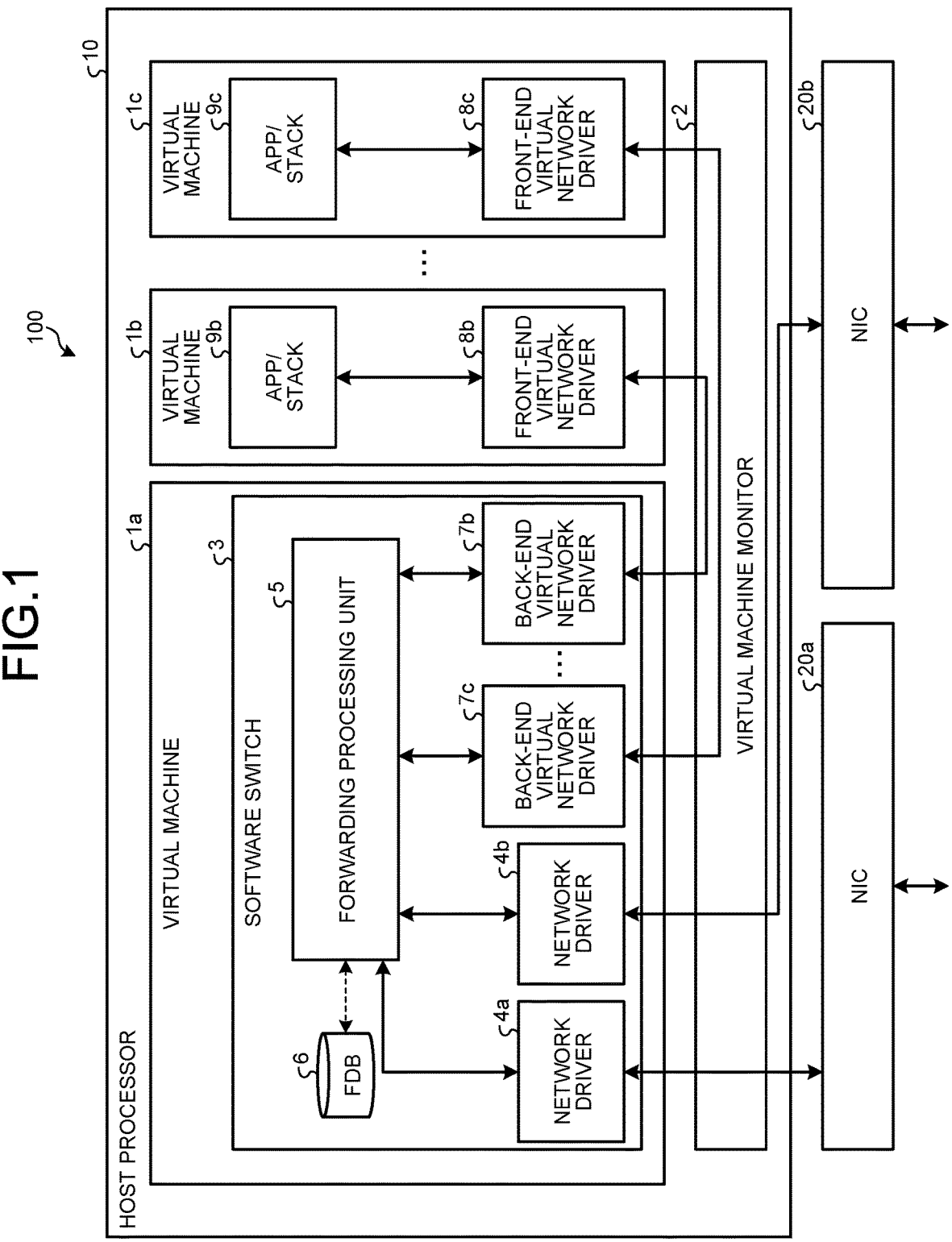
FIG. 1 is a schematic diagram illustrating an example of a communication apparatus in which a plurality of virtual machines operate.

According to an embodiment, a communication apparatus includes a task and a notification unit. The task stores, in a storage unit, notification information to be notified to a virtual machine as a notification destination via a virtual machine monitor after execution of predetermined processing. The notification unit collectively notifies the virtual machine monitor of a plurality of pieces of notification information stored in the storage unit.

Exemplary embodiments of a communication apparatus, a communication system, a notification method, and a program will be explained below in detail with reference to the accompanying drawings.

In a case where real-time communication processing between virtual machines is implemented by software, a delay in communication processing becomes a problem. Specifically, overhead caused by data copy and hypercall issuance at the time of data delivery between virtual machines has a great influence.

As a method for reducing the number of times issuance of a hypercall is performed, a method using an event notification by polling is conceivable instead of an interrupt-based event notification method. However, in a case of a polling-based event notification, a virtual machine on a side where an event is detected always monitors the state of a queue and the like, and CPU resources are consumed even when no event occurs. Therefore, the method using the event notification by polling is inefficient. In addition, a case where a general-purpose OS such as Linux (registered trademark) is used as a guest OS is also conceivable, and it is difficult to execute polling processing for all of them.

A notification method such as NEW API (NAP') in which interrupt-based processing and polling are combined is also conceivable, but in applications such as Time-Sensitive Networking (TSN) in which it is necessary to ensure the worst delay, processing in a case where an interrupt (hypercall) occurs requires the longest processing time, which is worst, and it is not possible to reduce jitter.

In the following embodiments, a communication apparatus, a communication system, a notification method, and a program capable of implementing a transfer timing control of a frame required for real-time communication by using a software switch and reducing the number of times issuance of a hypercall is performed will be described.

<Description of TSN>

First, an example of a standard used in fields such as industrial networks and in-vehicle networks that require high real-time performance will be described.

For example, as a standard for realizing real-time performance on Ethernet (registered trademark), standardization of Time-Sensitive Networking (TSN) is in progress by IEEE 802.1 TSN Task. TSN includes a plurality of standards. TSN is a standard that extends Audio/Video Bridging (AVB) and realizes low latency, which is used for professional audio and the like. TSN is a standard that aims to achieve high reliability in addition to higher real-time performance than AVB so that it can be applied to industrial networks and in-vehicle networks.

One of the TSN standards is IEEE 802.1Qbv. IEEE 802.1Qbv enables a strict control of a transmission timing of data (frame) for each priority (traffic class) by controlling a plurality of transmission buffers (transmission queues) with different priorities according to preset schedule information (gate control list). Each transmission buffer is provided with a gate that permits data transmission. When the gate is open (open state), data transmission is permitted, and when the gate is closed (close state), data transmission is prohibited.

<Description of Virtual Machine and Software Switch>

Next, an example in which a software technology such as a virtualization technology is applied to an industrial system, an in-vehicle system, and the like will be described. For example, it is conceivable to implement a switch (virtual switch) that connects virtual machines with software.

FIG. 1 is a schematic diagram illustrating an example of a communication apparatus 100 in which a plurality of virtual machines 1a to 1c operate. The example of FIG. 1 illustrates a case where a switch function is implemented by the virtual machine 1a operating on a host processor 10. The communication apparatus 100 includes the host processor 10 and network interface cards (NICs) 20a and 20b. Hereinafter, when the NICs 20a and 20b need not be distinguished, the NICs 20a and 20b will be simply referred to as NIC 20.

The host processor 10 is a device that controls the communication apparatus 100. The NIC 20 is a physical interface of the communication apparatus 100. A virtual machine monitor 2 controls the virtual machines 1a to 1c. The virtual machine monitor 2 is implemented by the host processor 10. The virtual machines 1a to 1c operate on the virtual machine monitor 2.

The virtual machine 1a includes a software switch 3. The software switch 3 includes network drivers 4a and 4b, a forwarding processing unit 5, a forwarding/filtering database (FDB) 6, and back-end virtual network drivers 7b and 7c.

The network drivers 4a and 4b control communication between the NIC 20 and the forwarding processing unit 5. The network drivers 4a and 4b read a frame (data) received by the NIC 20 and input the frame to the forwarding processing unit 5. Further, the network drivers 4a and 4b write a frame received from the forwarding processing unit 5 into the NIC 20.

The forwarding processing unit 5 refers to the FDB 6 to control a transfer destination of the frame.

The back-end virtual network drivers 7b and 7c control communication between the virtual machine 1a in which the software switch 3 operates and other virtual machines 1b and 1c (guest OSs).

The virtual machine 1b includes a front-end virtual network driver 8b and an application/network stack (app/stack) 9b. The front-end virtual network driver 8b controls communication between the app/stack 9b and the software switch 3.

The virtual machine 1c includes a front-end virtual network driver 8c and an application/network stack (app/stack) 9c. The front-end virtual network driver 8c controls communication between the app/stack 9c and the software switch 3.

<Description of Implementation of IEEE 802.1Qbv with Software Switch>

A case of implementing communication processing that strictly controls a transmission timing of each frame, such as IEEE 802.1Qbv with a software switch will be described.

Figure 2:
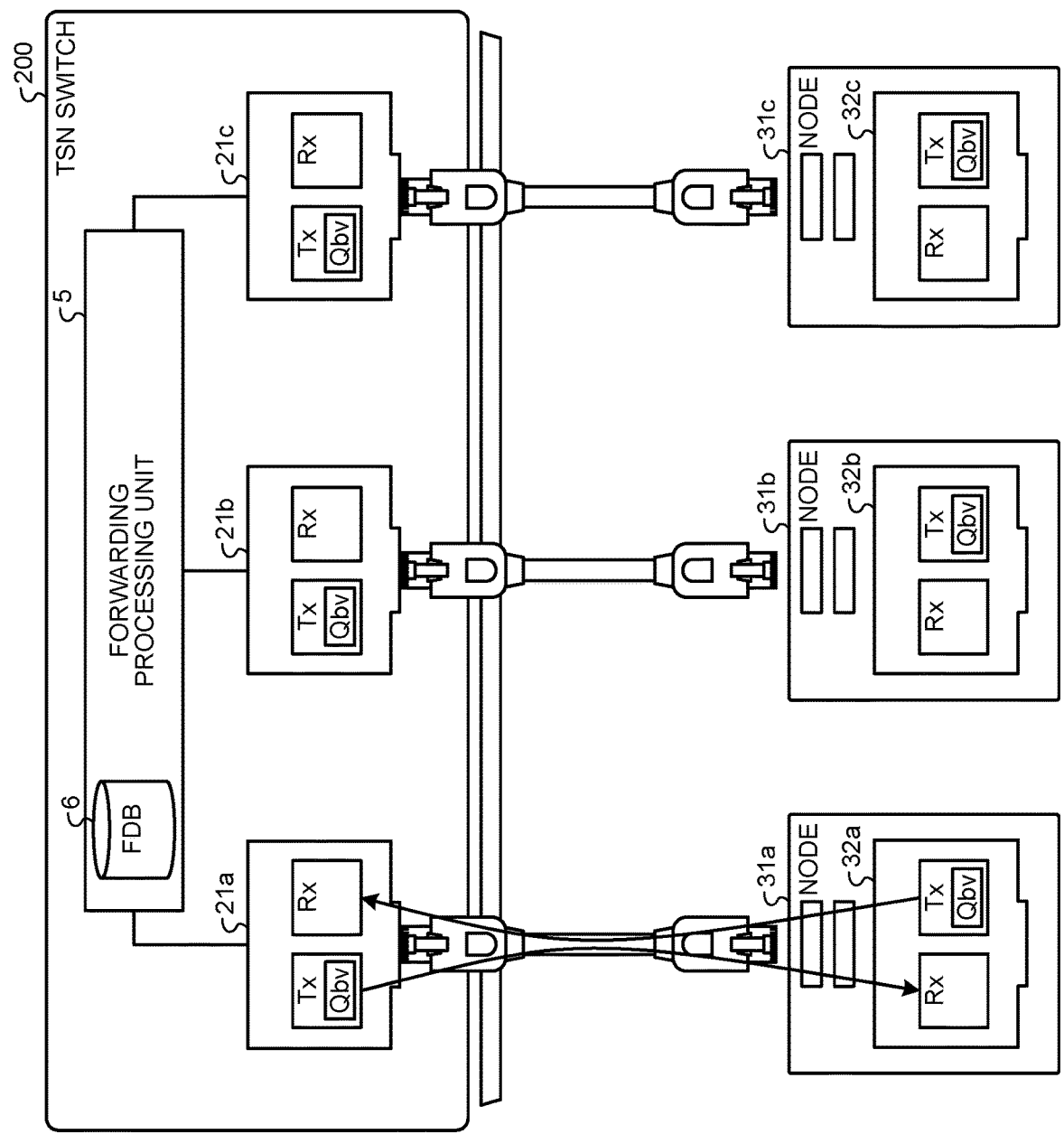
FIG. 2 is a diagram illustrating an example of a Qbv-compatible Time-Sensitive Networking (TSN) switch using normal hardware.

FIG. 2 illustrates an example of a Qbv-compatible TSN switch 200 using normal hardware. In FIG. 2, the TSN switch 200 includes three network interfaces 21a to 21c. The network interfaces 21a to 21c are connected to network interfaces 32a to 32c of nodes 31a to 31c, respectively. Each of the network interfaces 32a to 32c executes transmission processing (Tx) and reception processing (Rx). The transmission processing (Tx) is compatible with IEEE 802.1Qbv, and determines a frame transmission timing according to preset schedule information (Qbv).

Figure 3:
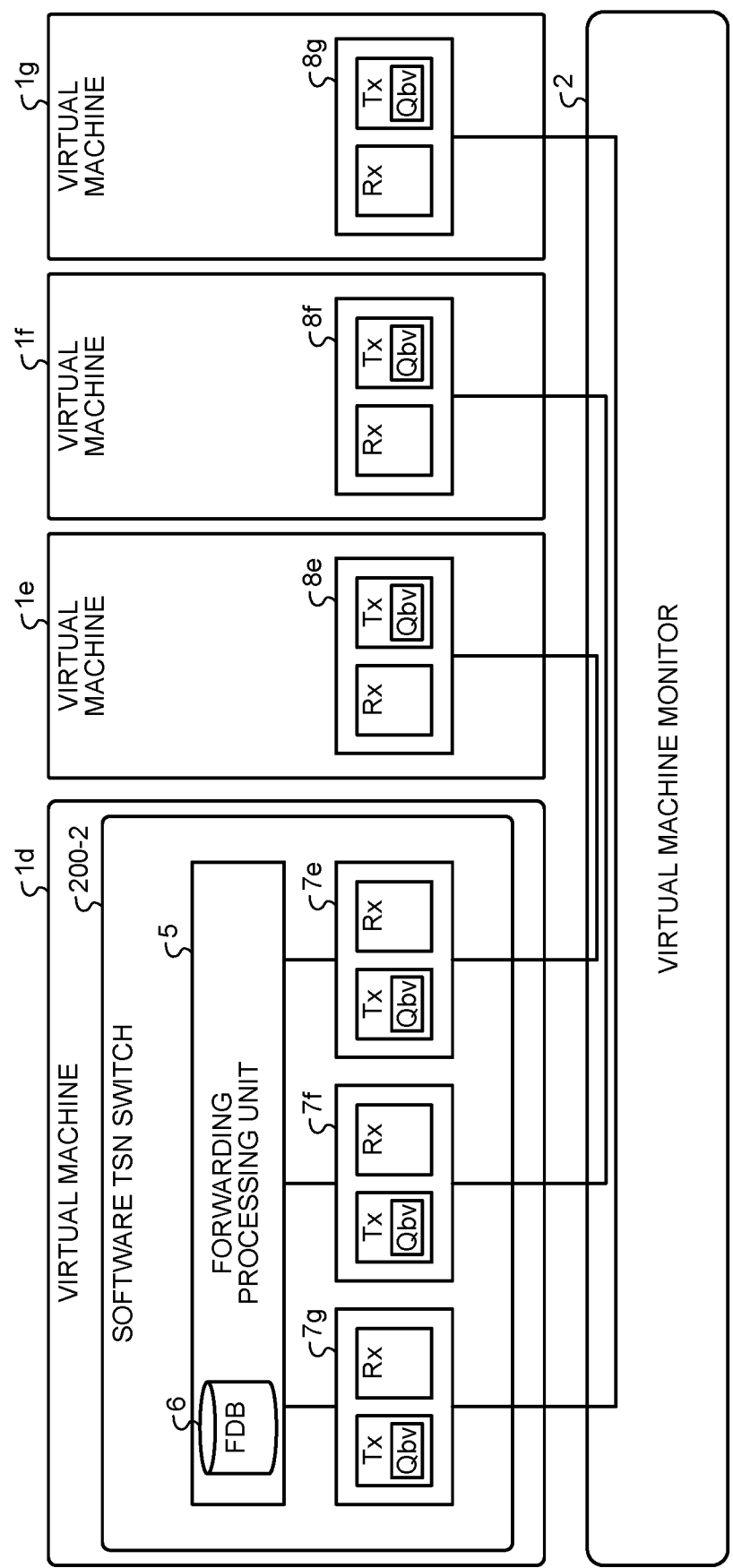
FIG. 3 is a diagram illustrating an example of a Qbv-compatible software TSN switch using a virtual machine.

FIG. 3 is a diagram illustrating an example of a Qbv-compatible software TSN switch 200-2 using a virtual machine 1d. The example of FIG. 3 illustrates a case in which the nodes 31a to 31c of FIG. 2 are consolidated as virtual machines 1e to 1g on one physical machine, and these virtual machines 1e to 1g are connected to a TSN switch (software TSN switch 200-2) implemented by the virtual machine 1d.

In a case where the TSN switch is simply virtualized as illustrated FIG. 3, front-end virtual network drivers 8e to 8g of guest OSs (virtual machines 1e to 1g) and back-end virtual network drivers 7e to 7g of the software TSN switch 200-2 each execute Qbv processing.

In this case, the following two problems occur.

(1) Time synchronization between virtual machines (2) Guest OS processing overhead First, (1) will be described. In TSN (Qbv), the respective network nodes are synchronized in time, and the synchronized time and schedule information are referenced to control a frame transmission timing. Therefore, also in the configuration of FIG. 3, it is necessary to synchronize times of system clocks or real-time clocks (RTCs) of the virtual machines 1d to 1g. As a synchronization method, a method using the precision time protocol (PTP) as in normal network processing or a method in which a virtual machine monitor or a driver provides a time synchronization function can be considered, but in any case, processing overhead occurs.

Next, (2) will be described. In a case where real-time communication such as TSN is implemented by software, it is preferable to reduce a processing time or fluctuation (jitter) in processing time by using a real time OS (RTOS) or the like. However, as an OS operating on each of the virtual machines 1e to 1g (each network node), a general-purpose OS is used depending on application. In general-purpose OS task scheduling, a complicated control is performed for efficiency in use of a central processing unit (CPU) and power saving. This causes difficulty in estimating the execution time, and the deterministic operation required for real-time processing (real-time communication) cannot be implemented.

As a method for solving the above problem, it is conceivable to concentrate pieces of processing related to Qbv in one virtual machine 1d.

Figure 4:
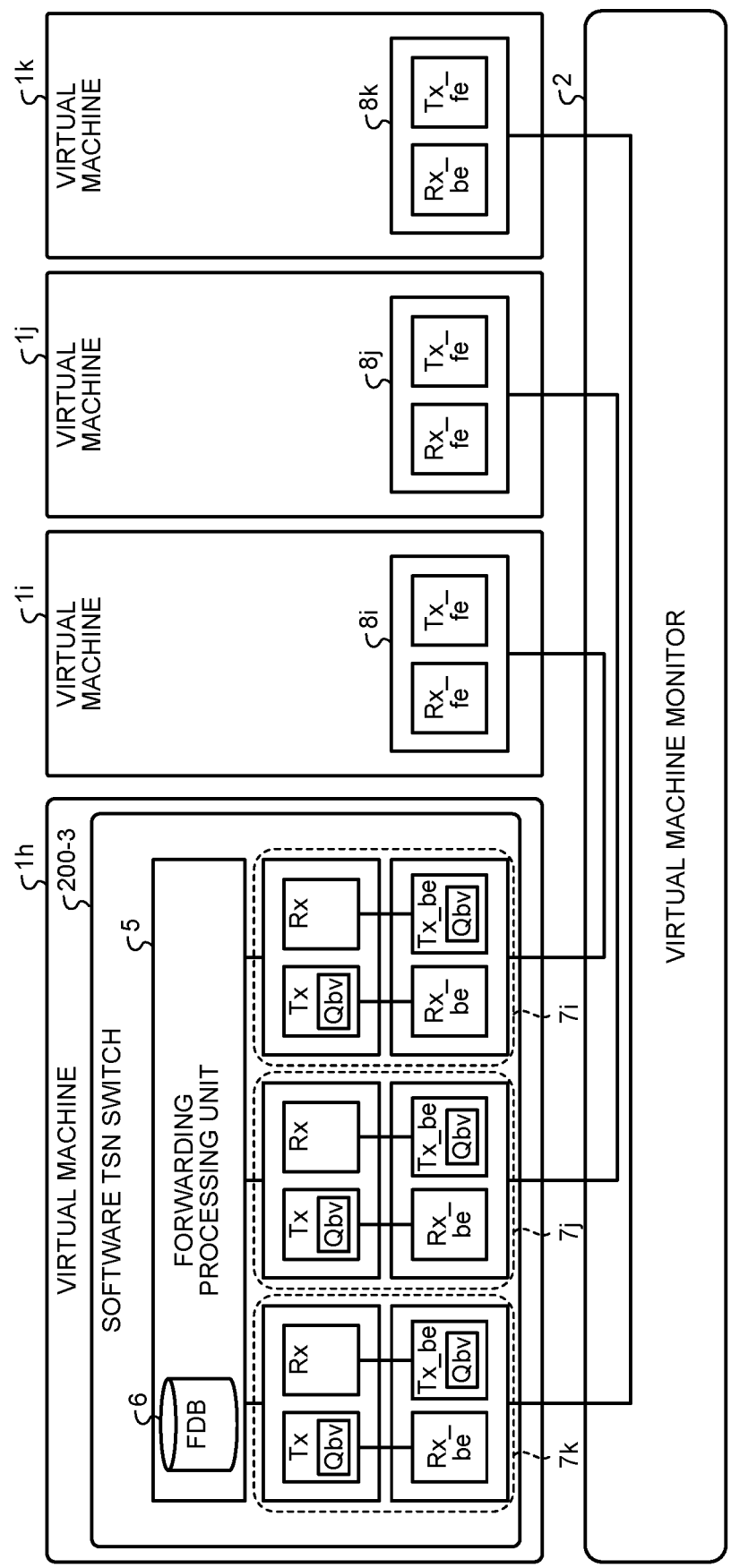
FIG. 4 is a diagram illustrating an example in which pieces of processing related to Qbv are concentrated in one virtual machine.

FIG. 4 is a diagram illustrating an example in which pieces of processing related to Qbv are concentrated in one virtual machine 1h. In FIG. 4, processing in each of the front-end virtual network drivers 8e to 8g of FIG. 3 is separated into back-end processing units Tx_be and Rx_be related to TSN and other front-end processing units Tx_fe and Rx_fe. A part related to TSN is processed by back-end virtual network drivers 7i to 7k of a software TSN switch 200-3.

Tx_be executes transmission processing including Qbv processing of each of virtual machines 1i to 1k. As processing other than the Qbv processing, IEEE 802.1Qav, Strict Priority (queue priority control), IEEE 802.1CB (redundancy processing), and the like can be considered, but the present invention is not limited thereto.

Rx_be executes reception processing of each of the virtual machines 1i to 1k. In Rx_be, IEEE 802.1Qci (filtering processing), IEEE 802.1CB (redundancy processing), and the like can be executed, but the present invention is not limited thereto.

Tx_fe and Rx_fe execute frame delivery processing between each of the virtual machines 1i to 1k and the software TSN switch 200-3.

As described above, with the configuration of FIG. 4, the pieces of processing related to TSN are concentrated in one virtual machine 1h (software TSN switch 200-3). As a result, times referenced in the TSN processing can be aggregated into one, and there is no need to perform time synchronization processing between the plurality of virtual machines 1i to 1k as illustrated FIG. 3. Further, even in a case of using a general-purpose OS on each of the virtual machines 1i to 1k, a part related to the TSN processing is not affected by task scheduling of the general-purpose OS.

Note that the number of virtual machines operating in the communication apparatus 100 is not limited to the example of FIG. 4 and may be arbitrary. In addition, the number of virtual machines operating in the communication apparatus 100 may be changed during operation of the communication apparatus 100.

<Description about Data Delivery Between Virtual Machines>

Figure 5:
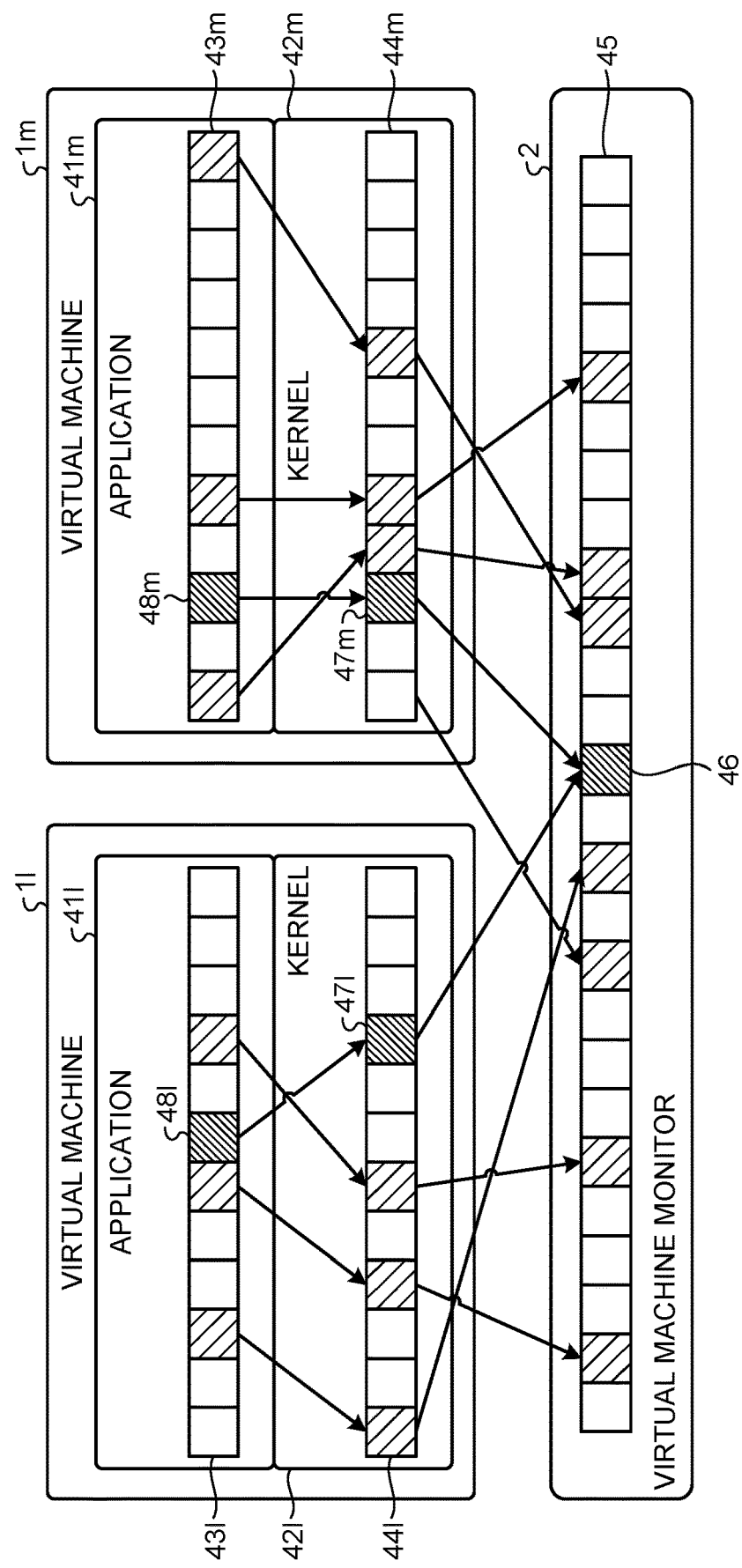
FIG. 5 is a diagram for describing data delivery between virtual machines.

FIG. 5 is a diagram for describing data delivery between virtual machines 1l and 1m.

The virtual machine 1l includes an application 41l and a kernel 42l. In the application 41l, data storage control is performed by a virtual memory 43l. In the kernel 42l, data storage control is performed by a pseudo-physical memory 44l. Similarly, in an application 41m, data storage control is performed by a virtual memory 43m. In a kernel 42m, data storage control is performed by a pseudo-physical memory 44m.

Hereinafter, when the virtual machines 1l and 1m need not be distinguished, the virtual machines 1l and 1m will be simply referred to as virtual machine 1. Similarly, when the virtual memories 43l and 43m need not be distinguished, the virtual memories 43l and 43m will be simply referred to as virtual memory 43. Similarly, when the pseudo-physical memories 44l and 44m need not be distinguished, pseudo-physical memories 44l and 44m will be simply referred to as pseudo-physical memory 44.

From the viewpoint of security and the like, functions provided to the guest OS (virtual machine 1) are limited so that each virtual machine 1 cannot directly access resources managed by other virtual machines 1. For example, the virtual machine monitor 2 executes processing such as access to a physical memory 45, a control of hardware such as NICs and storage devices, and issuance of privileged instructions. The virtual machine 1 issues a command such as a hypercall or VMExit, such that the virtual machine monitor 2 executes processing according to the hypercall or VMExit (hereinafter, a description will be made using the hypercall).

Data delivery between the virtual machines 1 is implemented by issuing the hypercall described above. The example of FIG. 5 illustrates an example of data delivery performed in a manner in which the plurality of virtual machines 1l and 1m share the same physical memory area 46. Each virtual machine 1 can directly access the virtual memory 43 and the pseudo-physical memory 44, and manages mapping information (correspondence) between the virtual memory 43 and the pseudo-physical memory 44. The virtual machine monitor 2 manages mapping information of the physical memory (machine memory) 45 and the pseudo-physical memory 44.

The memory mapping information is managed in page units (size such as 4 KB or 64 KB). Conversion between a virtual memory address or a pseudo-physical address, and a physical address is performed by a memory management unit (MMU), thereby enabling access to the physical memory based on the virtual memory address or the pseudo-physical address. In general, one area (page) of the physical memory 45 is mapped to the virtual memory 43 and the pseudo-physical memory 44 on a one-to-one basis.

As one of methods for delivering data between the virtual machines 1, there is a method of allowing a plurality of virtual machines 1 to access the same physical memory 45, like the physical memory area 46. An example of an operation of associating a pseudo-physical memory area 47l (virtual memory area 48l) of the virtual machine 1l and a pseudo-physical memory area 47m (virtual memory area 48m) of the virtual machine 1m with the same physical memory area 46 will be described (note that the operation is not limited thereto).

The virtual machine 1l issues a hypercall (setup) that instructs memory mapping, and makes a notification to the virtual machine monitor 2 so that the virtual machine 1m can perform mapping to the pseudo-physical memory area 47l. Information to be notified includes an address of the pseudo-physical memory area 47l, information of the virtual machine (the virtual machine 1m in FIG. 5) that is permitted to perform mapping, access restriction (Read Only, Read/Write, or the like), or the like.

The virtual machine monitor 2 receives the hypercall, allows the virtual machine 1m to perform mapping to the physical memory area 46 mapped to the pseudo-physical memory area 47l, and returns an identifier of corresponding memory mapping information to the virtual machine 1l. The virtual machine 1l notifies the virtual machine 1m of the identifier received using a control interface provided by the virtual machine monitor 2, or the like.

The virtual machine 1m issues a hypercall (map) to instruct the virtual machine monitor 2 to map the pseudo-physical memory area 47l and the pseudo-physical memory area 47m to each other. Information to be notified includes an address of the pseudo-physical memory area 47m, the identifier notified from the virtual machine 1l, information on a virtual machine as a mapping destination, or the like. The virtual machine monitor 2 specifies the physical memory address area 46 based on the notified identifier and maps the pseudo-physical memory area 47m.

To deliver data from the virtual machine 1l to the virtual machine 1m, the virtual machine 1l maps a page (the virtual memory area 48l or the pseudo-physical memory area 47l) in which data is written to a page of the virtual machine 1m, such that the virtual machine 1m can refer to the data. After the data delivery is completed (the virtual machine 1m reads the data), the virtual machine 1m issues a hypercall (unmap) to unmap the pseudo-physical memory area 47m and the physical memory 46.

The above-described processing is data delivery processing using the mapping of the same physical memory area 46.

In addition to the mapping to the same physical memory area 46, the method for delivering data also includes a method such as a copy method or a transfer method. In the copy method, data are copied between physical memory areas referenced by two virtual memory areas (pseudo-physical memory areas) designated by the virtual machine monitor 2. In the transfer method, mapping between two physical memory areas referenced by two virtual memory areas (pseudo-physical memory areas) designated by the virtual machine monitor 2 is replaced. Since the physical memory 45 is controlled in both the copy method and the transfer method, the virtual machine 1 needs to issue a hypercall to the virtual machine monitor 2.

<Regarding Hypercall>

The hypercall is used to notify the virtual machine monitor 2 of an event, in addition to the above data delivery. For example, the hypercall is also used for a transfer notification or completion notification of frame transfer processing. Specifically, when a frame is transmitted from the virtual machine 1 to another virtual machine 1, the transmission source virtual machine 1 writes the frame on a shared memory shared with the destination virtual machine 1, and issues the hypercall to the destination virtual machine 1. As a result, the destination virtual machine 1 can detect that the frame has been written on the shared memory and read the frame from the shared memory. Thereafter, when the destination virtual machine 1 reads the frame, the hypercall is issued to notify the transmission source virtual machine 1 of completion of frame reading. As described above, the hypercall is also used when a notification of some events is made between the virtual machines 1.

In addition, for processing of inputting/outputting to a console screen and the like, actual screen output processing is executed by the virtual machine monitor 2 or the virtual machine 1 for management. Therefore, the virtual machine monitor 2 or the virtual machine 1 for management delivers input/output character strings by using the hypercall. In addition, even in a case where a timer interrupt or the like is caused, since the virtual machine monitor 2 or the virtual machine 1 for management manages the timer itself, a notification of setting of the timer is also made by using the hypercall.

Figure 6:
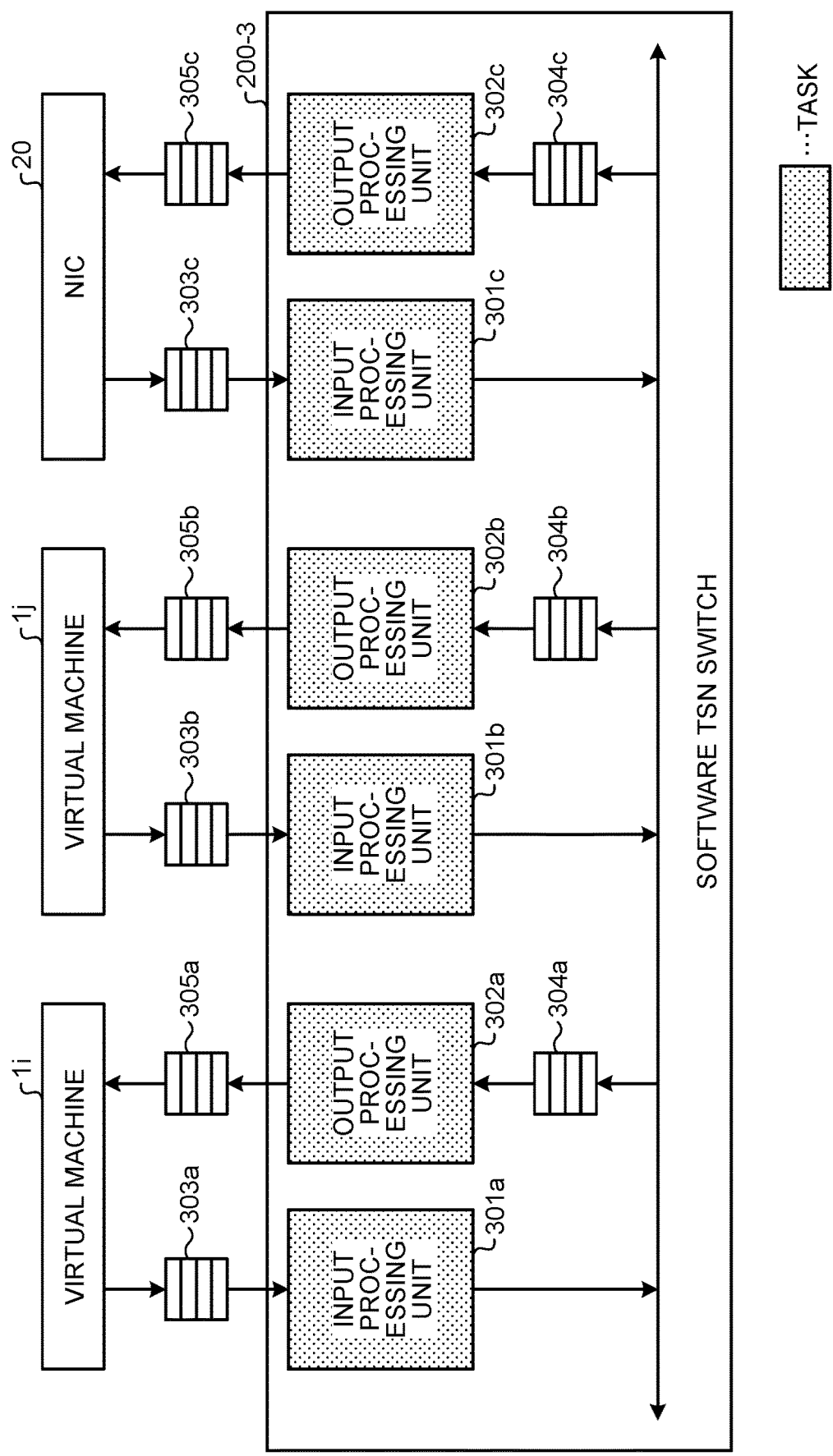
FIG. 6 is a schematic diagram illustrating a first example of a configuration related to input/output processing of a communication apparatus according to a first embodiment.

FIG. 6 is a schematic diagram illustrating a first example of a configuration related to input/output processing of the communication apparatus 100 according to the first embodiment. The communication apparatus 100 of the first embodiment is connected to the virtual machine 1i, the virtual machine 1j, and the NIC 20. The communication apparatus 100 executes data transfer processing (frame transfer processing) among the virtual machine 1i, the virtual machine 1j, and the NIC 20.

The software TSN switch 200-3 includes input processing units 301a to 301c, output processing units 302a to 302c, input buffers 303a to 303c, transfer buffers 304a to 304c, and output buffers 305a to 305c for each network port connected to the virtual machine 1i, the virtual machine 1j, and the NIC 20.

In a case where the input processing units 301a to 301c are not distinguished, they are simply referred to as input processing unit 301. Similarly, in a case where the output processing units 302a to 302c are not distinguished, they are simply referred to as output processing unit 302. Similarly, in a case where the input buffers 303a to 303c are not distinguished, they are simply referred to as input buffer 303. Similarly, in a case where the transfer buffers 304a to 304c are not distinguished, they are simply referred to as transfer buffer 304. Similarly, in a case where the output buffers 305a to 305c are not distinguished, they are simply referred to as output buffer 305.

Once data (frame) is received from the virtual machine 1i via the input buffer 303a, the input processing unit 301a refers to header information of the data to determine a transfer destination network port, and writes the data in the corresponding transfer buffer 304. For example, in a case where the destination of the data is the virtual machine 1j, the input processing unit 301a writes the data in the transfer buffer 304b.

Once data is acquired from the transfer buffer 304a, the output processing unit 302a outputs the data to the virtual machine 1i via the output buffer 305a.

Since the input processing units 301b and 301c are similar to the input processing unit 301a, a description thereof is omitted. Similarly, since the output processing units 302b and 302c are similar to the output processing unit 302a, a description thereof is omitted.

The communication apparatus 100 of the first embodiment implements the input processing unit 301 and the output processing unit 302 of each network port by tasks (input processing task and output processing task), and periodically executes the tasks in a scheduled order. As a result, fluctuation in processing time that is difficult to estimate by a context switch or the like is eliminated.

Figure 7:
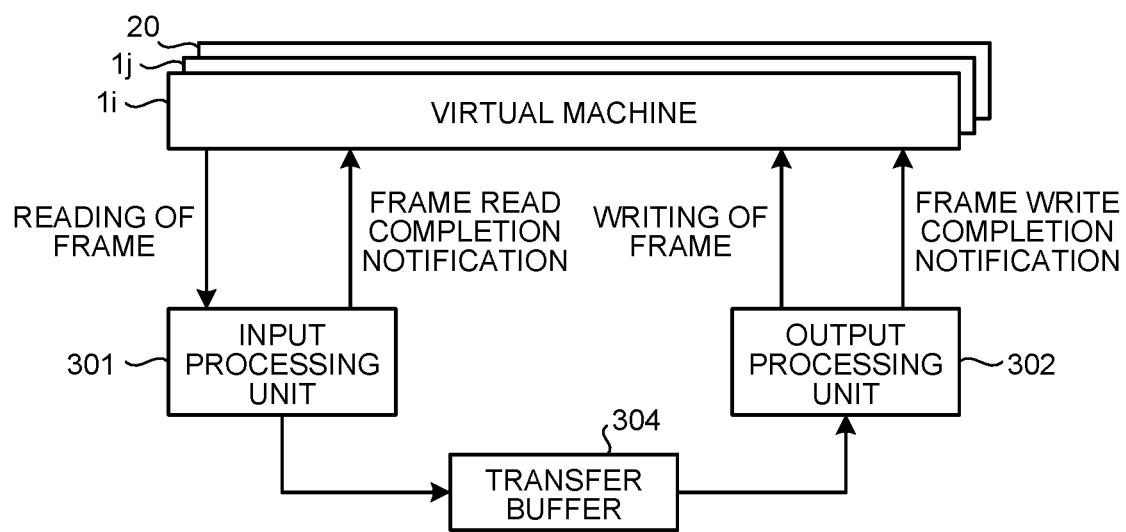
FIG. 7 is a schematic diagram illustrating a second example of the configuration related to the input/output processing of the communication apparatus according to the first embodiment.

Note that the input processing unit 301 and the output processing unit 302 do not have to be provided for each network port, and functions similar to those in FIG. 6 may be implemented by a configuration in which one input processing unit 301 and one output processing unit 302 are provided as illustrated in FIG. 7.

FIG. 7 is a schematic diagram illustrating a second example of the input/output processing of the communication apparatus 100 according to the first embodiment. In FIG. 7, the input processing unit 301/output processing unit 302 performs frame transfer while switching a processing target network port (virtual machine 1i/virtual machine 1j/NIC 20).

The input processing unit 301 corresponds to Tx_be and Rx of the back-end virtual network driver 7 in FIG. 4. Once a frame is received from the virtual machine 1i, the virtual machine 1j, or the NIC 20 via the input buffer 303, the input processing unit 301 refers to header information to determine a transfer destination network port, and writes the frame in the corresponding transfer buffer 304. The input processing unit 301 issues the hypercall to the virtual machine monitor 2 to notify the transmission source virtual machine 1 of completion of the frame transfer processing.

The virtual machine monitor 2 notifies the transmission source virtual machine 1 designated by the hypercall of completion of the transfer processing. Upon receiving the notification, the transmission source virtual machine 1 releases the input buffer 303.

The output processing unit 302 corresponds to Tx and Rx_be of the back-end virtual network driver 7 in FIG. 4. The output processing unit 302 receives a frame from the transfer buffer 304 and delivers the frame to the virtual machine 1 (or the NIC 20) via the output buffer 305. Finally, the output processing unit 302 issues the hypercall to the virtual machine monitor 2 in order to notify the destination virtual machine 1 that the frame has been written in the output buffer 305. The virtual machine monitor 2 notifies the destination virtual machine 1 designated by the hypercall that the frame has been transferred. Upon receiving the notification, the destination virtual machine 1 reads the frame from the output buffer 305.

Figure 8:
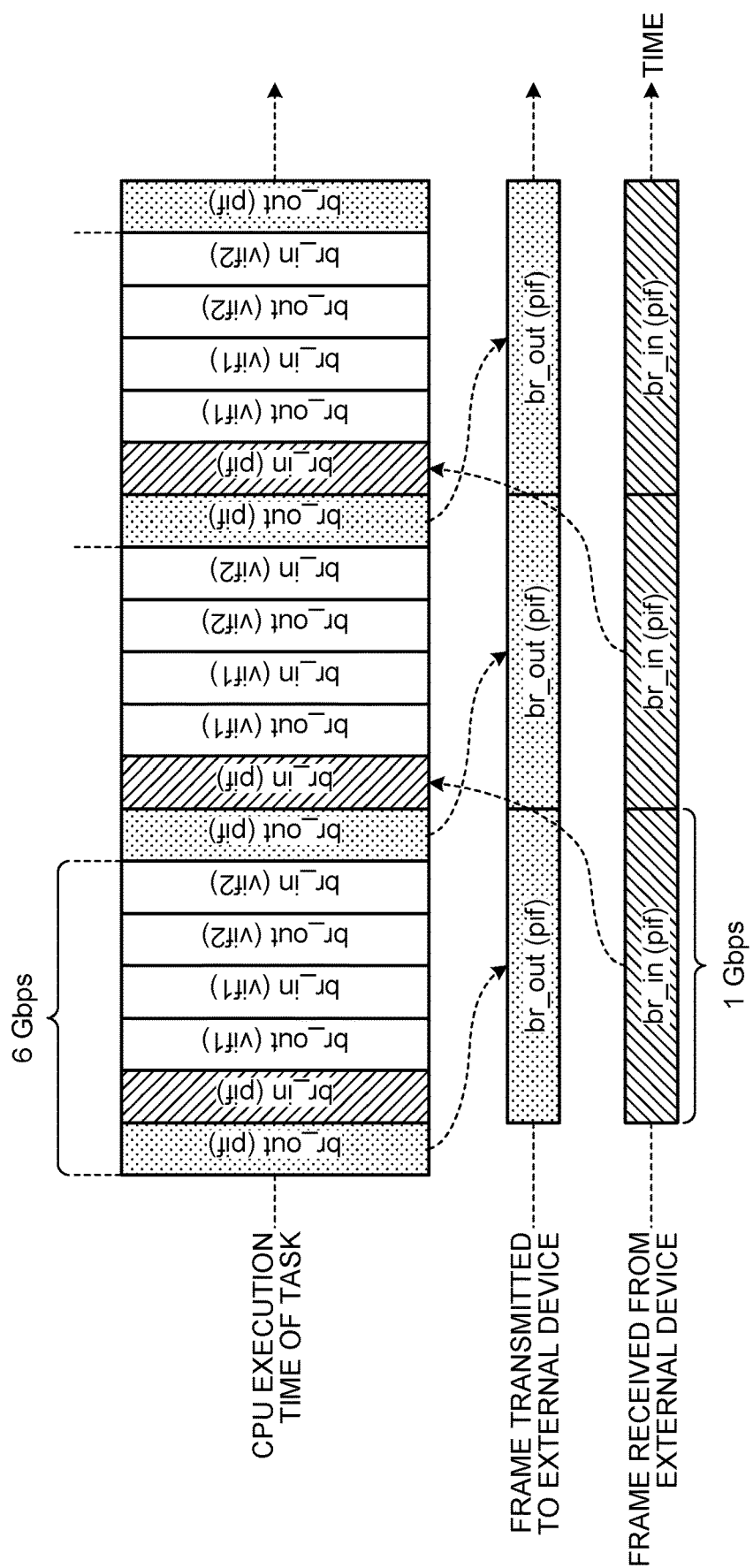
FIG. 8 is a diagram illustrating execution of a task according to the first embodiment.

FIG. 8 is a diagram illustrating execution of a task according to the first embodiment. The example of FIG. 8 illustrates execution of a task in a case where there is one CPU that operates the software TSN switch 200-3. In addition, the example of FIG. 8 illustrates a case where the communication speed of a physical network is 1 Gbps.

The software TSN switch 200-3 periodically executes each task. br_out(pif) indicates a task of the output processing unit 302c. br_in(pif) indicates a task of the input processing unit 301c. pif represents a physical IF and corresponds to the NIC 20 of FIG. 6.

br_out(vif1) indicates a task of the output processing unit 302a. br_in(vif1) indicates a task of the input processing unit 301a. vif1 represents a virtual IF and corresponds to the virtual machine 1i of FIG. 6.

br_out(vif2) indicates a task of the output processing unit 302b. br_in(vif2) indicates a task of the input processing unit 301b. vif2 represents a virtual IF and corresponds to the virtual machine 1j of FIG. 6.

Figure 9:
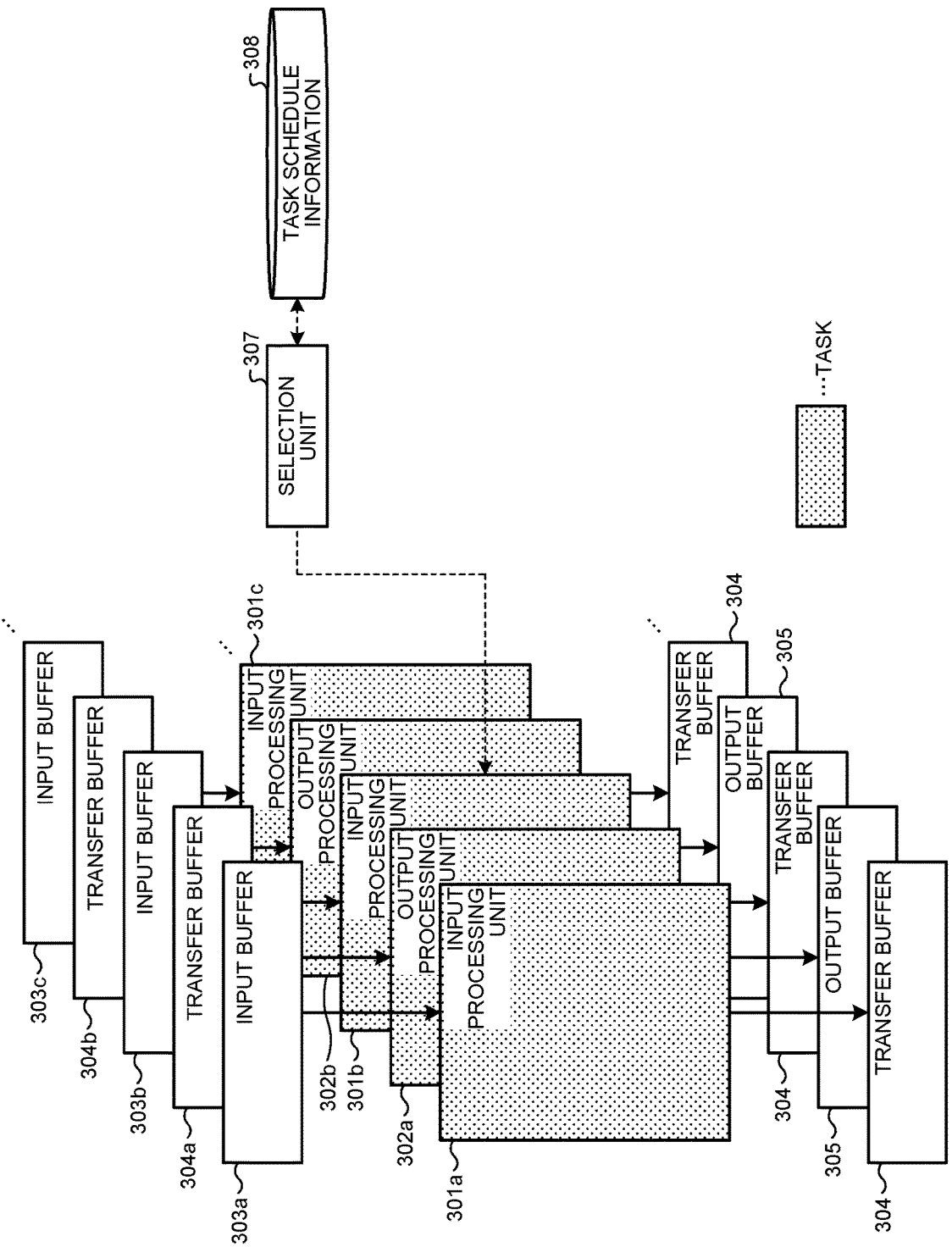
FIG. 9 is a diagram illustrating an example of a configuration related to task control processing of the communication apparatus according to the first embodiment.

FIG. 9 is a diagram illustrating an example of a configuration related to task control processing of the communication apparatus 100 according to the first embodiment. In the example of FIG. 9, a selection unit 307 refers to a task schedule information DB 308 to determine tasks to be sequentially started. Note that the input processing unit 301 and the output processing unit 302 may be provided individually for each network port (the configuration in FIG. 6), or one input processing unit 301 and one output processing unit 302 may be provided (the configuration in FIG. 7).

The task schedule information DB 308 stores information on a task to be executed. The task schedule information DB 308 stores schedule information (first schedule information) indicating an execution order of a plurality of tasks. The plurality of tasks are periodically executed based on the schedule information.

FIG. 10A is a diagram illustrating a first example of the task schedule information DB 308 according to the first embodiment. FIG. 10A illustrates the task schedule information DB 308 in a case where the configuration related to the input/output processing of the communication apparatus 100 illustrated in FIG. 6 is applied.

br_in( ) indicates a task of the input processing unit 301, and indicates an interface as an input processing target. For example, br_in(pif) indicates a task of the input processing unit 301c. br_out( ) indicates a task of the output processing unit 302, and indicates an interface as an output processing target. For example, br_out(pif) indicates a task of the output processing unit 302c. fdb_clean indicates a task of deleting an old entry in a forwarding/filtering database (FDB).

stat_update indicates a task of processing statistical information (for example, the number of transmitted frames and the number of received frames) of the communication apparatus 100.

Note that the task scheduled and managed in the task schedule information DB 308 is a non-pre-emption task, and is a task that is not interrupted by other tasks during execution.

FIG. 10B is a diagram illustrating a second example of the task schedule information DB 308 according to the first embodiment. FIG. 10B illustrates the task schedule information DB 308 in a case where the configuration related to the input/output processing of the communication apparatus 100 illustrated in FIG. 7 is applied.

In FIG. 10A, a task to be executed is held, but in FIG. 10B, a task to be executed and its argument are held. When the task to be executed is the input processing unit (br_in)/output processing unit (br_out), the argument is a target network port.

The selection unit 307 sequentially executes the tasks based on the task schedule information stored in the task schedule information DB 308. Specifically, the selection unit 307 selects a task designated by next_task and increments next_task by +1. Once processing of the selected task is completed, the selection unit 307 selects a task designated by next_task that has been incremented by +1 and increments next_task by +1. As a result, the tasks included in the task schedule information are sequentially executed. In a case where an ID designated by next_task is at the end of the schedule information DB (in the example of FIGS. 10A and 10B, the ID is 10), the processing returns to a task having an ID of 1.

As described above, by periodically executing the task (input processing unit 301/output processing unit 302) for each virtual machine 1, the frame transfer of each virtual machine 1 is performed at regular intervals, and a deterministic operation required for real-time processing (real-time communication) such as TSN can be implemented.

Returning to FIG. 9, the input buffer 303 is a buffer used when a frame is delivered from the virtual machine 1 to the software TSN switch 200-3. In a case of IEEE 802.1Qbv, the input buffer 303 includes a plurality of queues divided for each traffic class. The input buffer 303 may be provided on the software TSN switch 200-3 side, on the virtual machine 1 side, or on the virtual machine monitor 2 (virtual machine monitor (VMM) or hypervisor) side.

The input processing unit 301 is activated upon reception of the notification from the selection unit 307, reads the frame of the input buffer 303 as described above, determines the transfer destination, and writes the frame in the corresponding transfer buffer 304.

The transfer buffer 304 is a buffer used when a frame is delivered from the input processing unit 301 to the output processing unit 302. In a case of IEEE 802.1Qbv, the transfer buffer 304 includes a plurality of queues divided for each traffic class.

The output processing unit 302 is activated upon reception of the notification from the selection unit 307, reads the frame of the transfer buffer 304 as described above, and writes the frame in the output buffer 305.

The output buffer 305 is a buffer used when a frame is delivered from the software TSN switch 200-3 to the virtual machine 1. The output buffer 305 may be provided on the software TSN switch 200-3 side, on the virtual machine 1 side, or on the virtual machine monitor 2 side.

<Problem of Event Notification Using Hypercall>

Here, a problem of an event notification using the hypercall will be described with reference to FIG. 11.

Figure 11:
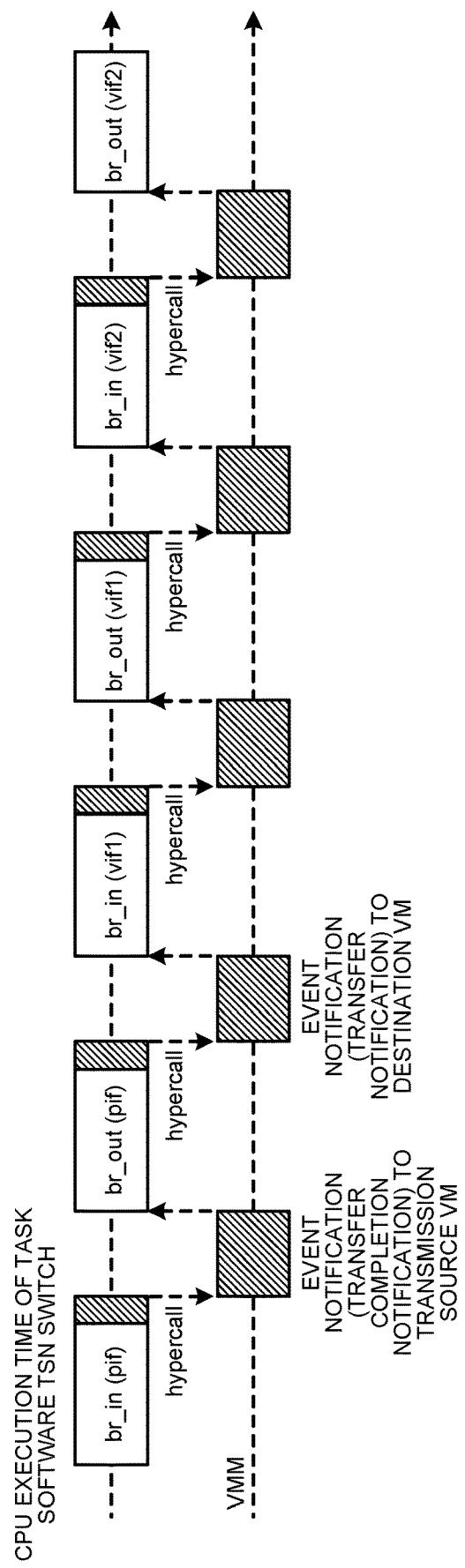
FIG. 11 is a diagram for describing a problem of an event notification using a hypercall.

FIG. 11 is a diagram for describing a problem of an event notification using the hypercall. In the example of FIG. 11, an example of a timing at which each of a frame transfer completion notification (a notification from the input processing unit 301 to the transmission source virtual machine 1) and a frame transfer notification (a notification from the output processing unit 302 to the virtual machine monitor 2) using the hypercall is made is illustrated. In a case where the input processing unit 301 and the output processing unit 302 are periodically executed for each network port as illustrated in FIG. 9, normally, each of the input processing unit 301/output processing unit 302 issues the hypercall as illustrated in FIG. 11. The processing is passed to the virtual machine monitor 2 by using the hypercall, and the virtual machine monitor 2 executes appropriate processing according to information notified by the hypercall. When the processing is passed (traps) to the virtual machine monitor 2, processing such as switching the operation mode of the CPU to a privileged mode with higher authority occurs. This processing becomes an overhead, and there arises a problem that a processing delay that is difficult to estimate occurs.

Therefore, the communication apparatus 100 according to the first embodiment collectively issues one hypercall for a plurality of tasks executed at a constant cycle (batch processing).

Figure 12:
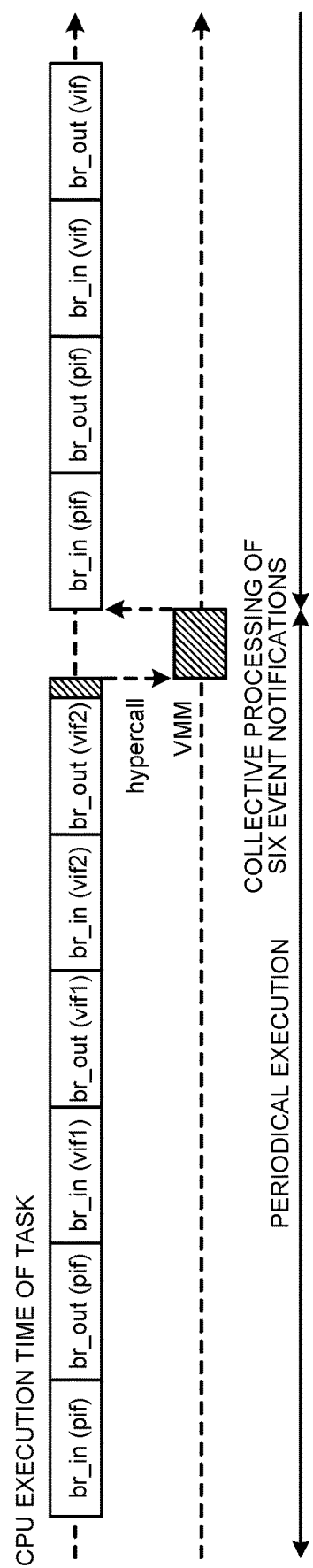
FIG. 12 is a diagram illustrating an example of a hypercall issuance timing according to the first embodiment.

FIG. 12 is a diagram illustrating an example of a hypercall issuance timing according to the first embodiment. In the example of FIG. 12, six event notifications are collectively processed by using one hypercall.

Figure 13:
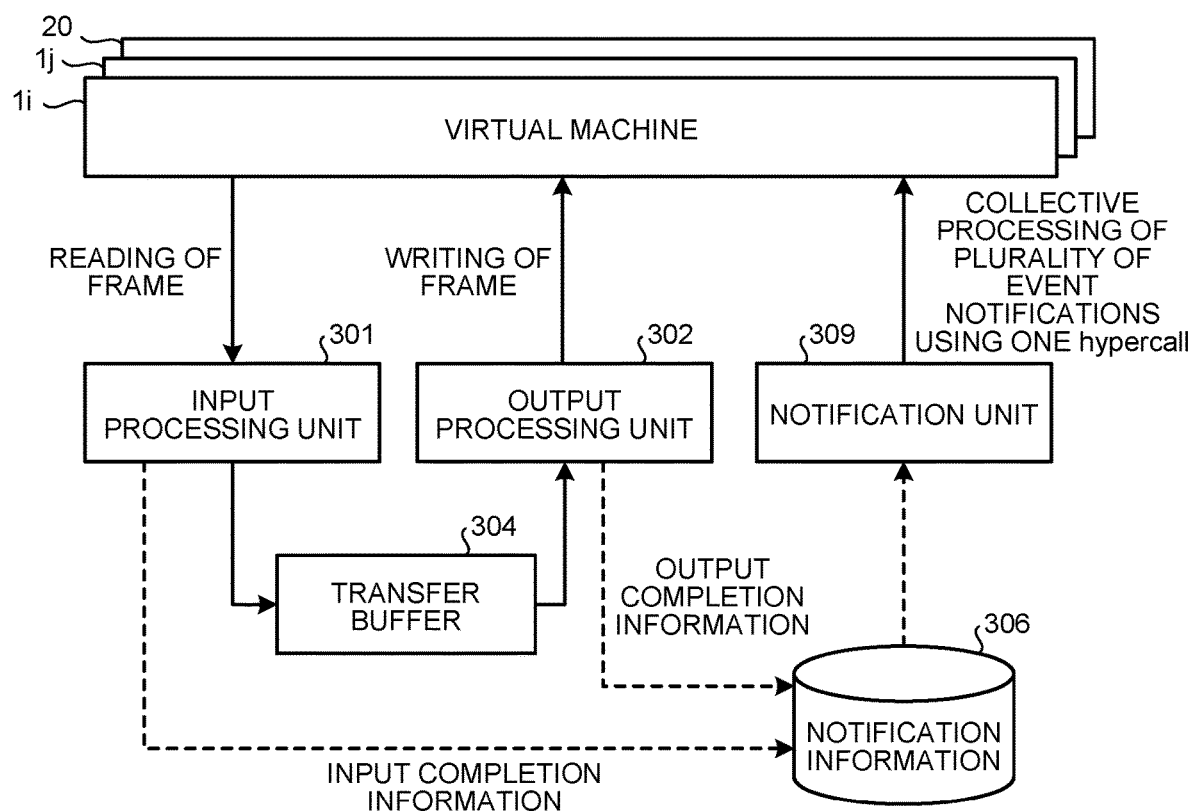
FIG. 13 is a diagram illustrating an example of a configuration related to notification processing of the communication apparatus according to the first embodiment.

FIG. 13 is a diagram illustrating an example of a configuration related to notification processing of the communication apparatus 100 according to the first embodiment. Once a frame is received from the virtual machine 1i, the virtual machine 1j, or the NIC 20 via the input buffer 303, the input processing unit 301 refers to header information to determine a transfer destination network port, and writes the frame in the corresponding transfer buffer 304.

The input processing unit 301 stores input completion information (read completion notification) in a notification information DB 306 in order to notify the transmission source virtual machine 1 of completion of the frame transfer processing.

Next, the output processing unit 302 receives a frame from the transfer buffer 304 and passes the frame to the virtual machine 1 (or the NIC 20) via the output buffer 305. Finally, the output processing unit 302 stores output completion information (write completion notification) in the notification information DB 306 in order to notify the destination virtual machine 1 that the frame has been written in the output buffer 305.

The notification information DB 306 stores notification information (for example, an event notification such as the input completion information and output completion information described above, and the like) generated from each task within one cycle from issuance of a previous hypercall to issuance of a next hypercall.

The notification unit 309 collectively notifies the virtual machine monitor 2 of a plurality of pieces of notification information stored in the notification information DB 306. Specifically, the notification unit 309 collectively notifies the virtual machine monitor 2 of a plurality of pieces of notification information stored in the notification information DB 306 by a plurality of tasks executed within one cycle, for example. In addition, for example, the notification unit 309 notifies the virtual machine monitor 2 of a plurality of pieces of notification information stored in the notification information DB 306 by using one hypercall. Once the hypercall is received, the virtual machine monitor 2 notifies a notification destination such as the virtual machine 1 and the NIC 20 of notification information notified by using the hypercall.

Note that the example of FIG. 13 illustrates a case where there is one input processing unit 301/one output processing unit 302, but there may be a plurality of input processing units 301/output processing units 302 as illustrated in FIG. 6.

Example of Notification Information

FIG. 14 is a diagram illustrating an example of the notification information DB 306 according to the first embodiment. The notification information DB 306 includes the type of the hypercall, information indicating a notification destination virtual machine, information notified by using each hypercall, and the like.

For example, after performing the frame transfer, the input processing unit 301/output processing unit 302 registers the notification information in the notification information DB 306 without issuing the hypercall by itself. The notification unit 309 acquires a plurality of pieces of notification information from the notification information DB 306 and notifies the virtual machine monitor 2 (VMM) of a hypercall including the plurality of pieces of notification information. Then, the notification unit 309 deletes the notified notification information from the notification information DB 306.

Note that the notification unit 309 may notify of the notification information held in the notification information DB 306 by using one hypercall, or may dividedly notify of multiple hypercalls including a plurality of pieces of notification information. The virtual machine monitor 2 notifies each virtual machine 1 of the notification information based on the notification information notified from the notification unit 309 by using the hypercall.

Here, as for an execution timing of the notification unit 309, the notification unit 309 may be registered in the above-described task schedule information as a task and periodically operated, or the notification unit 309 may be executed at regular time intervals by using a timer or the like.

Example of Notification Method

FIG. 15 is a flowchart illustrating an example of a notification method according to the first embodiment. First, each task (for example, the input processing unit 301, the output processing unit 302, and the like) executes processing (predetermined processing determined for each task) (Step S1).

Next, each task registers notification information based on the processing in Step S1 in the notification information DB 306 (Step S2). Next, the notification unit 309 refers to the notification information DB 306 (Step S3) and notifies the virtual machine monitor 2 (VMM) of a hypercall including a plurality of pieces of notification information. Next, the virtual machine monitor 2 notifies each notification destination of the notification information (Step S5).

As described above, in the communication apparatus 100 according to the first embodiment, a task (for example, the input processing unit 301, the output processing unit 302, and the like) stores notification information notified to the notification destination virtual machine 1 via the virtual machine monitor 2 in the storage unit (in the embodiment, the notification information DB 306) after execution of predetermined processing. Then, the notification unit 309 collectively notifies the virtual machine monitor 2 of a plurality of pieces of notification information stored in the storage unit.

As a result, with the communication apparatus 100 according to the first embodiment, it is possible to suppress a delay in transfer processing required for real-time communication. Specifically, in the communication apparatus 100 according to the first embodiment, for example, the notification unit 309 can collectively notify the virtual machine monitor 2 (VMM) of the notification information of the task executed within one cycle of the task schedule information by using one hypercall. As a result, the number of times issuance of a hypercall is performed and the number of times of trapping to the virtual machine monitor 2 can be reduced, and a deterministic operation required for real-time processing (real-time communication) can be implemented.

Second Embodiment

Next, a second embodiment will be described. In a description of the second embodiment, a description of the same content as that of the first embodiment is omitted, and only differences from the first embodiment will be described. In the second embodiment, a case of controlling whether or not to collectively notify of notification information for each notification destination will be described.

Figure 16:
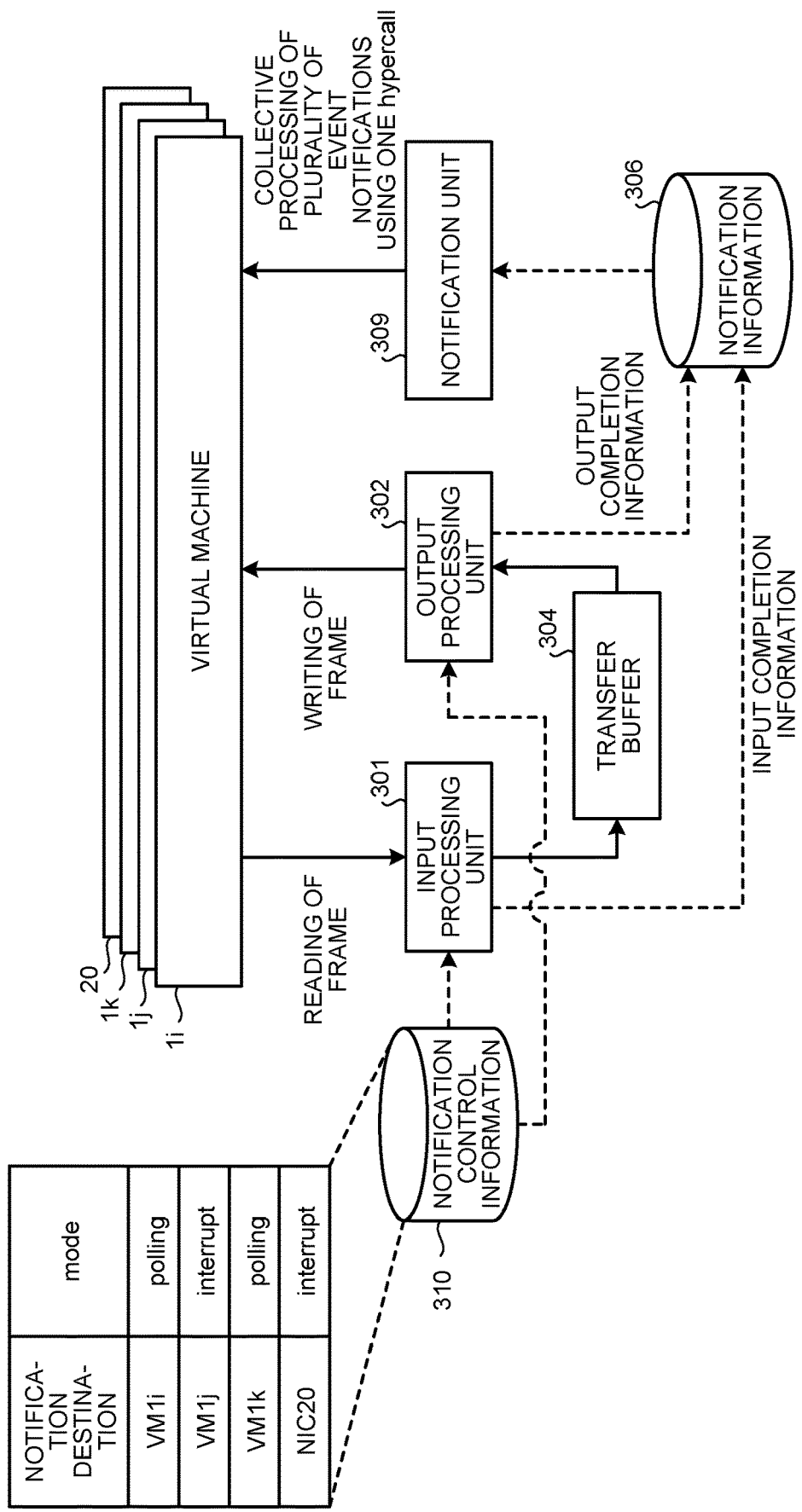
FIG. 16 is a diagram illustrating an example of a configuration related to notification processing of a communication apparatus according to a second embodiment.

FIG. 16 is a diagram illustrating an example of a configuration related to notification processing of a communication apparatus 100 according to the second embodiment. In the second embodiment, a notification control information DB 310 is further added to the configuration of the first embodiment (see FIG. 13).

The notification control information DB 310 stores a notification control method for notification information for each transfer destination. In the example of FIG. 16, for example, virtual machines (VM) 1$i$ and 1$k$ acquire the notification information by polling. Meanwhile, a virtual machine (VM) 1$j$ and an NIC 20 receive the notification information by receiving an interrupt (hypercall).

Figure 17:
FIG. 17 is a diagram illustrating an example of task schedule information according to the second embodiment.

In a task schedule information DB 308 according to the second embodiment, as illustrated in FIG. 17, the notification control method for notification information is also stored for each task. A notification control for an event occurring in each task is performed by an interrupt (hypercall) or polling.

In a case of the interrupt (hypercall), similarly to the first embodiment, an input processing unit 301/output processing unit 302 registers the notification information in a notification information DB 306. On the other hand, in a case of the polling, the notification destination always checks by itself whether or not an event has occurred. Therefore, in a case of the polling, the input processing unit 301/output processing unit 302 does not register the notification information in the notification information DB 306 even when the frame transfer is completed.

That is, in the second embodiment, a storage unit (in the present embodiment, the notification control information DB 310) stores the notification control method for notification information for each virtual machine 1. After executing read processing, an input processing task (input processing unit 301) stores a read completion notification in the storage unit (in the present embodiment, the notification information DB 306) in a case where the notification control method corresponds to the interrupt, and does not store the read completion notification in the storage unit (does not perform issuance to a virtual machine monitor) in a case where the notification control method corresponds to the polling. In addition, after executing write processing, an output processing task (output processing unit 302) stores a write completion notification in the storage unit (in the present embodiment, the notification information DB 306) in a case where the notification control method corresponds to the interrupt, and does not store the write completion notification in the storage unit (does not perform issuance to the virtual machine monitor) in a case where the notification control method corresponds to the polling.

As a result, according to the second embodiment, whether or not to collectively notify of the notification information can be flexibly changed according to an operation situation of the notification destination.

Third Embodiment

Next, a third embodiment will be described. In a description of the third embodiment, a description of the same content as that of the first embodiment is omitted, and only differences from the first embodiment will be described. In the third embodiment, a case of controlling whether or not to collectively notify of notification information based on the number of pieces of notification information to be notified.

Figure 18:
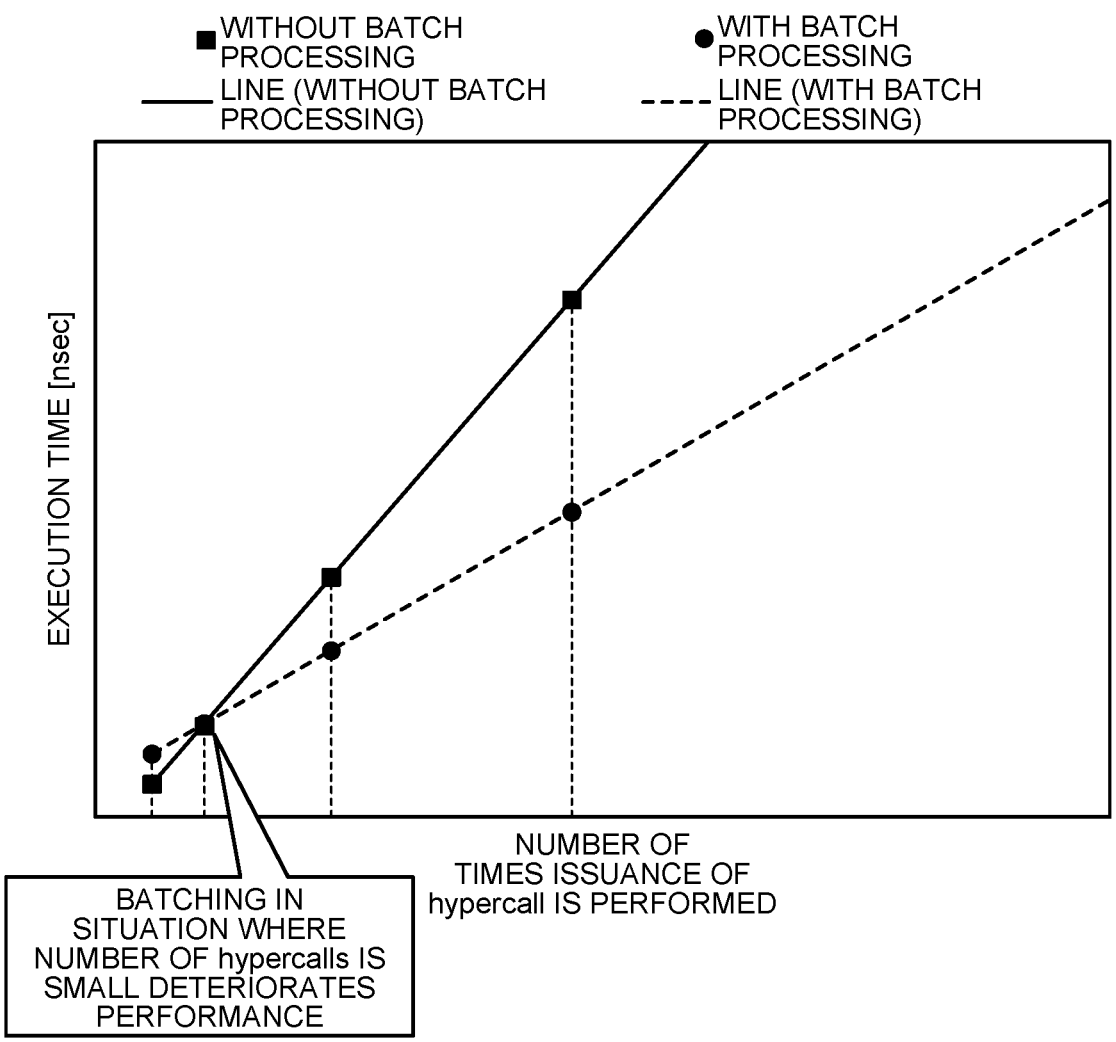
FIG. 18 is a diagram illustrating a relationship between the number of hypercalls and performance (execution time) according to a third embodiment.

FIG. 18 is a diagram illustrating a relationship between the number of hypercalls and performance (execution time) according to the third embodiment. In a case where the number of events notified by batch processing is small, a processing time may be increased as compared with a case where the batch processing is not executed. Therefore, a notification unit 309 according to the third embodiment determines whether or not to execute processing of batching the notification information (batch processing) based on the number of hypercalls generated within one cycle. For example, the number of pieces of notification information based on events occurring within one cycle can be estimated from the number of virtual machines 1 accommodated in a communication apparatus 100.

For example, the notification unit 309 estimates the number of pieces of notification information based on the number of virtual machines 1, requests a task to notify the virtual machine 1 of the notification information via a virtual machine monitor 2 after execution of predetermined processing in a case where the number of pieces of notification information is equal to or less than a threshold value, and requests the task to store the notification information in a storage unit (in the embodiment, a notification information DB 306) after execution of the predetermined processing in a case where the number of pieces of notification information is larger than the threshold value.

Specifically, the notification unit 309 estimates the number N of pieces of notification information from, for example, N=the number of virtual machines×2 (input processing unit 301/output processing unit 302)+α (a hypercall from the task such as console output processing). In a case where N is larger than the threshold value, the notification unit 309 switches a notification control for notification information to the batch processing.

As described above, in the third embodiment, the task notifies the virtual machine 1 of the notification information via the virtual machine monitor 2 after execution of the predetermined processing in a case where the number of pieces of notification information generated within a predetermined period is equal to or less than the threshold value, and stores the notification information in the storage unit (in the embodiment, the notification information DB 306) after execution of the predetermined processing in a case where the number of pieces of notification information is larger than the threshold value. Further, in a case where the number of pieces of notification information is larger than the threshold value, the notification unit 309 collectively notifies the virtual machine monitor 2 of a plurality of pieces of notification information stored in the storage unit.

As a result, according to the third embodiment, for example, even in a case where the number of virtual machines 1 operating in the communication apparatus 100 varies, it is possible to suppress a delay in transfer processing required for real-time communication.

Fourth Embodiment

Next, a fourth embodiment will be described. In a description of the fourth embodiment, a description of the same content as the first embodiment is omitted, and only differences from the first embodiment will be described. In the fourth embodiment, a detailed configuration including a control by IEEE 802.1Qbv will be described.

Figure 19A:
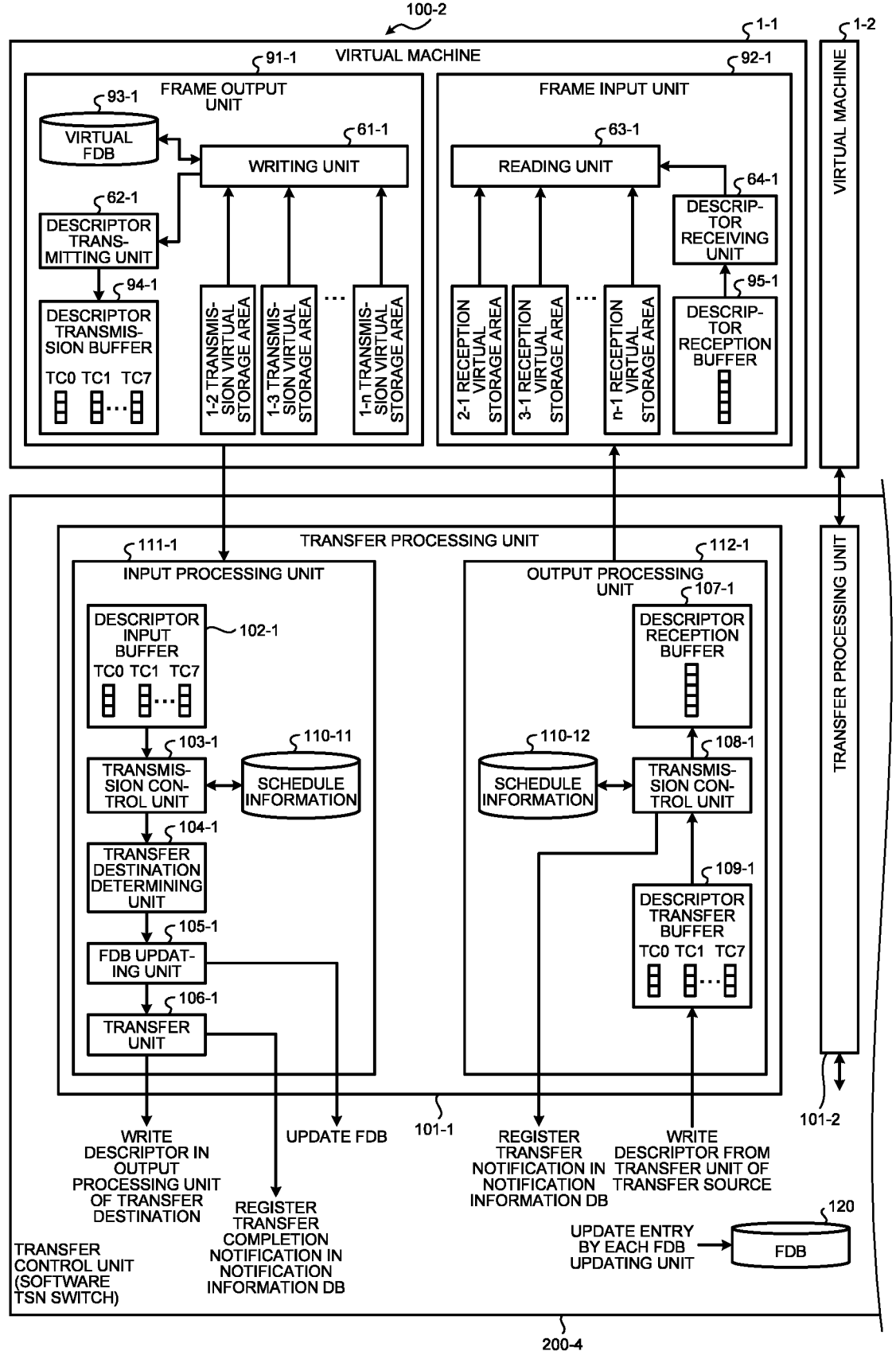
FIG. 19A is a diagram illustrating an example of a functional configuration of a communication apparatus according to a fourth embodiment.
Figure 19B:
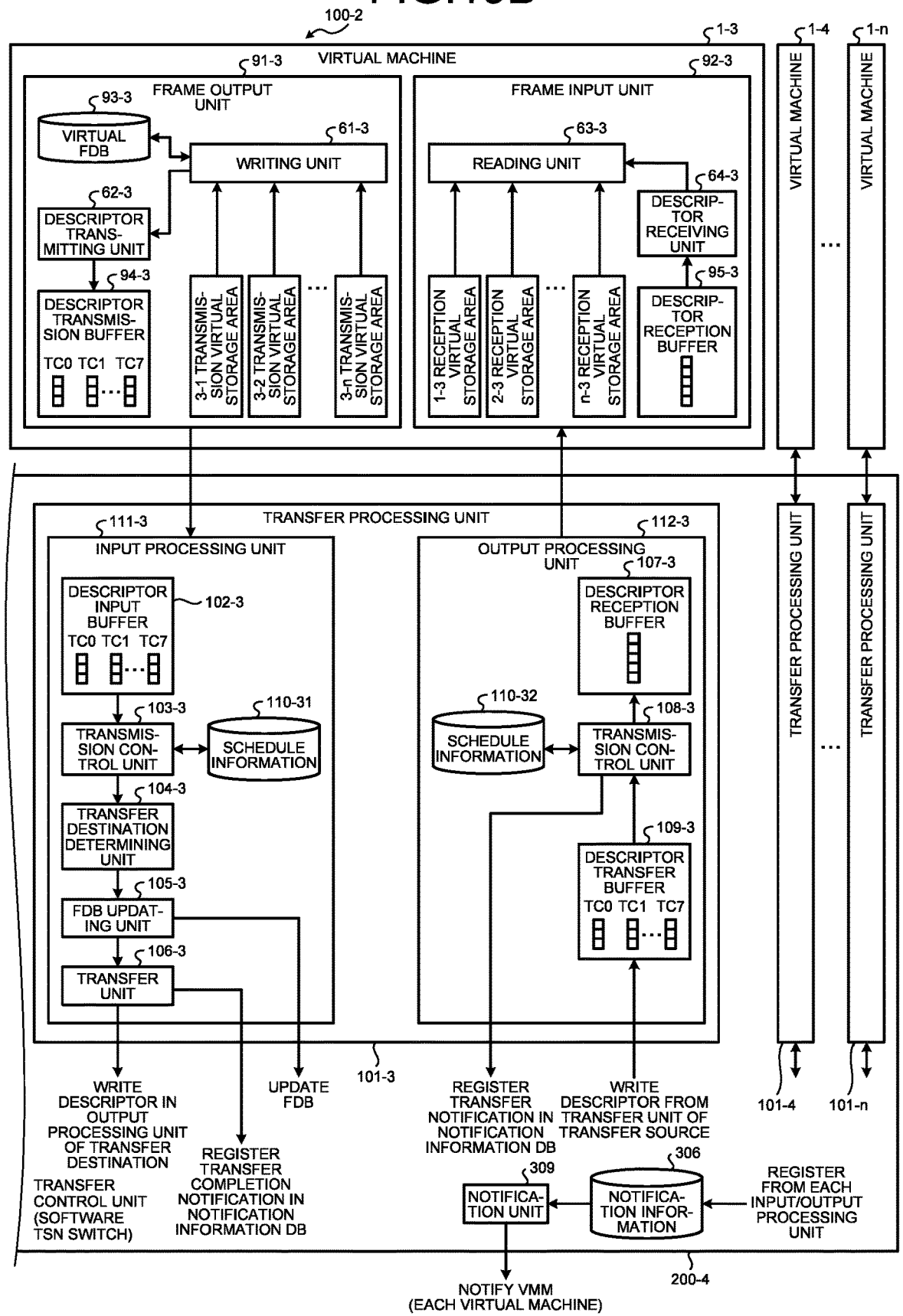
FIG. 19B is a diagram illustrating the example of the functional configuration of the communication apparatus according to the fourth embodiment.

FIGS. 19A and 19B are diagrams illustrating an example of a functional configuration of a communication apparatus 100-2 according to the fourth embodiment. The communication apparatus 100-2 of the fourth embodiment includes virtual machines 1-1 to 1-n and a software TSN switch 200-4. FIGS. 19A and 19B illustrate an example in which the software TSN switch (transfer control unit) 200-4 supports IEEE 802.1Qbv. In FIGS. 19A and 19B, n virtual machines 1-1 to 1-n are connected to the software TSN switch 200-4.

Hereinafter, when the virtual machines 1-1 to 1-n need not be distinguished, the virtual machines 1-1 to 1-n will be simply referred to as virtual machine 1. Note that other functional blocks of which the number is plural may also be abbreviated when those functional blocks need not be distinguished, similarly to the virtual machines 1-1 to 1-n.

The virtual machine 1-1 includes a frame output unit 91-1 and a frame input unit 92-1.

The frame output unit 91-1 includes a writing unit 61-1, a descriptor transmitting unit 62-1, a virtual FDB 93-1, a descriptor transmission buffer 94-1, and a 1-2 transmission virtual storage area to a 1-n transmission virtual storage area.

The frame input unit 92-1 includes a reading unit 63-1, a descriptor receiving unit 64-1, a descriptor reception buffer 95-1, and a 2-1 reception virtual storage area to an n-1 reception virtual storage area.

The virtual machines 1-2 to 1-n also have the same configuration as that of the virtual machine 1-1.

The software TSN switch 200-4 includes transfer processing units 101-1 to 101-n, an FDB 120, a notification information DB 306, and a notification unit 309. The transfer processing units 101-1 to 101-n are connected to the corresponding virtual machines 1-1 to 1-n, respectively. Note that the software TSN switch 200-4 may be implemented by a dedicated HW instead of software.

The transfer processing unit 101-1 includes an input processing unit 111-1 and an output processing unit 112-1.

The input processing unit 111-1 includes a descriptor input buffer 102-1, a transmission control unit 103-1, a transfer destination determining unit 104-1, an FDB updating unit 105-1, a transfer unit 106-1, and schedule information (second schedule information) 110-11.

The output processing unit 112-1 includes a descriptor output buffer 107-1, a transmission control unit 108-1, a descriptor transfer buffer 109-1, and schedule information (second schedule information) 110-12.

The transfer processing units 101-2 to 101-n also have the same configuration as that of the transfer processing unit 101-1.

First, the virtual FDB 93 will be described. A pseudo-physical memory (virtual memory) that stores the virtual FDB 93 of each virtual machine 1 is mapped to a storage unit (physical memory) that stores the FDB 120 of the software TSN switch 200-4. That is, the respective virtual machines 1 refer to the same FDB 120. Mapping between the virtual FDB 93 and the FDB 120 is performed, for example, when the communication apparatus 100-2 (switch) is initialized.

Further, in the example of FIGS. 19A and 19B, the update of the FDB 120 is performed by the software TSN switch 200-4 (FDB updating unit 105), and the frame output unit 91 performs reading (Read-Only). The FDB 120 (virtual FDB 93) includes information for determining a transfer destination of the frame. Specifically, the information for determining the transfer destination includes information such as an identifier of a transfer destination network port (network interface or virtual machine 1), a MAC address, a VLAN ID, and the last transmission time.

Next, a transmission virtual storage area of the frame output unit 91 and a reception virtual storage area of the frame input unit 92 will be described. The transmission virtual storage area is used as a transmission buffer of the frame output unit 91, and the reception virtual storage area is used as a reception buffer of the frame input unit 92. The transmission/reception virtual storage area is divided into areas for each pair of a transmission source virtual machine 1 and a destination virtual machine 1. For example, in a case where a frame whose transfer source is the virtual machine 1-1 and whose destination is the virtual machine 1-3 is transferred, the 1-3 transmission virtual storage area and the 1-3 reception virtual storage area are used.

Hereinafter, in the fourth embodiment, a method in which the transmission virtual storage area and the reception virtual storage area are mapped to the same physical memory area 46 (see FIG. 5) in advance for each pair at the time of starting the switch or the like will be described as an example.

Next, the descriptor transmission buffer 94 and the descriptor input buffer 102 will be described. The descriptor transmission buffer 94 and the descriptor input buffer 102 are divided into queues (FIFOs) for each traffic class (TC) of a frame. A correspondence between a priority code point (PCP) included in an IEEE 802.1Q header and the traffic class is specified in advance.

The descriptor transmission buffer 94 is a virtual memory area (pseudo-physical memory area) managed by the virtual machine 1. The descriptor input buffer 102 is a memory area managed by the software TSN switch 200-4.

The descriptor transmission buffer 94 and the descriptor input buffer 102 map the same physical memory area in advance, for example, when the communication apparatus 100-2 (switch) is initialized. The descriptor transmission buffer 94 and the descriptor input buffer 102 are used to deliver the descriptor between the frame output unit 91 and an input processing unit 111.

Next, the descriptor reception buffer 95 and the descriptor output buffer 107 will be described. The descriptor reception buffer 95 is a virtual memory area (pseudo-physical memory area) managed by the virtual machine 1. The descriptor output buffer 107 is a memory area managed by the software TSN switch 200-4.

The descriptor reception buffer 95 and the descriptor output buffer 107 map the same physical memory area in advance, for example, when the communication apparatus 100-2 (switch) is initialized. The descriptor reception buffer 95 and the descriptor output buffer 107 are used to deliver a descriptor between the frame input unit 92 and the output processing unit 112.

Next, an operation according to the fourth embodiment will be described. First, the frame output unit 91 will be described. First, the writing unit 61 receives a transfer target frame from an application or network stack. The writing unit 61 refers to header information of the received frame and the virtual FDB to determine a frame transfer destination.

The writing unit 61 writes the frame in a transmission virtual storage area for the destination virtual machine 1. In a case where a ring buffer is used, the writing unit 61 refers to the buffer information, and writes, in a case where there is a free area, the frame in a buffer of Head and advances Head by 1.

In a case where there is no free area, the writing unit 61 discards the frame or waits until the destination virtual machine 1 releases the buffer (waits until there is a free area). Alternatively, for example, the writing unit 61 may check Head/Tail by polling. Alternatively, for example, a control interface for the destination virtual machine 1 to notify that there is a free area may be separately provided.

The writing unit 61 issues a frame writing notification to the descriptor transmitting unit 62. With the frame writing notification, an identifier of the transfer destination virtual machine 1, position information of the transmission virtual storage area in which the frame is written (an identifier of the ring buffer or the like), information necessary for transfer processing, such as a MAC address and a VLAN ID, information required for TSN processing such as a priority code point (PCP) or a traffic class (TC) of a frame, and a frame size, and the like are notified.

Next, an operation of the descriptor transmitting unit 62 will be described. The descriptor transmitting unit 62 determines a position of the descriptor transmission buffer 94 in which the descriptor is to be written, based on a PCP or TC included in a received frame writing notification. The descriptor transmitting unit 62 stores the information received from the writing unit 61 in the descriptor and writes the descriptor in the descriptor transmission buffer 94. The descriptor may include a transmission time, statistical information, or the like, in addition to the information included in the frame writing notification received from the writing unit 61.

Further, for example, the descriptor transmitting unit 62 may receive only a buffer address of the transmission virtual storage area in which the frame is written by the writing unit 61, and the descriptor transmitting unit 62 may refer to header information and the like of the frame from the buffer to generate or write a descriptor. As described above, since the descriptor transmission buffer 94 is mapped to the same physical memory as the descriptor input buffer 102 of the software TSN switch 200-4, the descriptor transmission buffer 94 can be referenced by a transmission control unit 103 to be described later.

The operation of the frame output unit 91 has been described above.

Next, the input processing unit 111 of the transfer processing unit 101 will be described.

First, an operation of the transmission control unit 103 will be described. First, the transmission control unit 103 checks a traffic class permitted for transmission, from a current time and the schedule information (gate control list) of a schedule information DB 110. Next, the transmission control unit 103 reads a descriptor of a transfer target frame from a queue (descriptor input buffer 102) of the traffic class permitted for transmission. In a case where frames (descriptors) of a plurality of traffic classes can be transmitted, the transmission control unit 103 determines a frame to be transferred by a method such as Strict Priority or Credit Based Shaper (IEEE 802.1Qav). The transmission control unit 103 inputs the read descriptor to the transfer destination determining unit 104. In a case where there is no frame that can be transmitted, the processing ends and the next frame transmission processing is executed (waiting until a new descriptor is written, waiting until a schedule state is changed, or the like).

The above-described operation is the operation of the transmission control unit 103. In addition to the above processing, the transmission control unit 103 may execute processing of determining whether or not the frame can be transmitted within a time allowed by a schedule in consideration of a guard band or the like, based on a frame size stored in the read descriptor, a current time, and schedule information of the schedule information DB 110. Further, although the processing of IEEE 802.1Qbv is assumed in the fourth embodiment, the present invention is not limited thereto.

Next, an operation of the transfer destination determining unit 104 will be described. The transfer destination determining unit 104 refers to an identifier of a transfer destination virtual machine 1 described in the descriptor, and determines the descriptor transfer buffer 109 in which the descriptor is to be written. For example, in a case where the transfer destination is the virtual machine 1-3, a descriptor transfer buffer 109-3 of the transfer processing unit 101-3 is a writing destination.

Next, an operation of the FDB updating unit 105 will be described. First, the FDB updating unit 105 checks whether or not an entry (MAC address and VLAN ID) of the transmission source virtual machine 1 exists in the FDB 120. In a case where the entry does not exist, the FDB updating unit 105 registers the entry and writes a network interface, a MAC address, a VLAN ID, the last transmission time, and the like. In a case where the entry exists, for example, the latest time of the entry is updated.

Finally, an operation of the transfer unit 106 will be described. The transfer unit 106 writes the descriptor in a queue of a corresponding traffic class of the descriptor transfer buffer 109 determined by the transfer destination determining unit 104. In a case of a single-task operation (for example, a case of an operation with a single-core CPU), the input processing unit 111 of each virtual machine 1 is operated in order, and thus the input of the descriptor is serialized in the descriptor transfer buffer 109. On the other hand, in a case of a multi-task operation (for example, a case of an operation with a multi-core CPU or a case of parallel processing in HW), since multiple pieces of input processing of the respective virtual machines 1 are executed in parallel, in the writing to the descriptor transfer buffer 109, it is necessary to prevent contention in access by taking a lock or the like to serialize a transfer order of the descriptors.

Once the writing of the descriptor to the output processing unit 112 of the transfer destination is completed, the transfer unit 106 of the input processing unit 111 registers a transfer completion notification in the notification information DB 306.

The above-described operation is the operation of the input processing unit 111. The input processing unit 111 can transfer the frame (descriptor) transmitted from each virtual machine 1 to the output processing unit 112 for the destination virtual machine 1 according to a transmission timing of IEEE 802.1Qbv. This means that the Qbv processing of the network interface of the transmission source virtual machine 1 is executed (corresponding to Tx_be in FIG. 4).

Next, an operation of the output processing unit 112 will be described. In an operation of the transmission control unit 108, basically, the same processing as that of the transmission control unit 103 of the input processing unit 111 is performed. In the transmission control unit 108 of the output processing unit 112, a reading source buffer is the descriptor transfer buffer 109, and a writing destination is the descriptor output buffer 107 (descriptor reception buffer 95). Here, the descriptor output buffer 107 (descriptor reception buffer 95) provides one queue (FIFO), but may also be divided into queues for each traffic class, similarly to the descriptor input buffer 102 or the descriptor transfer buffer 109.

Once the writing of the descriptor to the transfer destination virtual machine 1 (descriptor reception buffer 95) is completed, the transmission control unit 108 of the output processing unit 112 registers a transfer notification in the notification information DB 306.

The above-described operation is the operation of the output processing unit 112. The output processing unit 112 can transfer the descriptor to the destination virtual machine 1 according to the transmission timing of IEEE 802.1Qbv. This means that the Qbv processing of the network interface of the software TSN switch 200-4 (switch) is executed (corresponding to Tx in FIG. 4).

The notification unit 309 acquires a plurality of pieces of notification information from the notification information DB 306, and notifies each virtual machine 1 of a hypercall including the plurality of pieces of notification information via a virtual machine monitor 2 (VMM). Then, the notification unit 309 deletes the notified notification information from the notification information DB 306.

Next, an operation of the frame input unit 92 will be described. First, the descriptor receiving unit 64 reads a descriptor from a queue (FIFO) of the descriptor reception buffer 95. The descriptor receiving unit 64 specifies a transmission virtual storage area in which the frame is stored from the descriptor and makes a notification to the reading unit 63.

The reading unit 63 refers to buffer information of the notified virtual storage area, reads the first frame (a frame written at a Tail position), and delivers the frame to the application or network stack. Once the frame delivery is completed, the reading unit 63 releases the buffer and increments Tail by +1.

The above-described operation is the transfer operation according to the fourth embodiment. Hereinafter, some additional descriptions will be provided.

First, the mapping between the transmission/reception virtual storage area and a physical memory area 45 will be additionally described. The mapping between the transmission/reception virtual storage area and the physical memory area 45 may be performed, for example, when the communication apparatus 100-2 (switch) is initialized. Alternatively, for example, the mapping between the transmission/reception virtual storage area and the physical memory area 45 may be performed by issuing a hypercall (map)/(unmap) each time a frame is transmitted as in the first embodiment.

Alternatively, for example, the mapping between the transmission/reception virtual storage area and the physical memory area 45 may be performed at a timing at which a new entry is registered in the FDB 120. In this case, for example, the mapping between the transmission/reception virtual storage area and the physical memory area 45 is released at a timing at which the entry is deleted from the FDB 120 because, for example, frame transmission is not performed for a certain period.

In other words, the timing at which a new entry is registered in the FDB 120 is a timing at which a communication pair of a transmission source virtual machine 1 and a destination virtual machine 1 is generated. By doing so, unnecessary use of memory resources is prevented by not mapping (not using) the transmission/reception virtual storage area when communication is not established between the virtual machines 1, which is advantageous.

As an example of the operation, in a case where an entry of a communication interface of a transmission destination does not exist when the writing unit 61 refers to the virtual FDB 93, a new transmission virtual storage area is secured and set so that another virtual machine 1 can perform mapping (hypercall (setup)). A frame of which an entry does not exist in the FDB 120 is multicast (broadcast) and transferred to the frame input unit 92 of each of all virtual machines 1. Here, the writing unit 61 (or the descriptor transmitting unit 62) adds, to the descriptor, information indicating that the frame is to be multicast (broadcast).

The reading unit 63 refers to the descriptor received from the transfer control unit 60, and in a case where the frame is to be multicast (broadcast) and the reading unit 63 is the reading unit 63 of the virtual machine 1 that is a transfer destination of the frame, the reading unit 63 newly secures a reception virtual storage area and maps the reception virtual storage area to a transmission virtual storage area described in the descriptor (hypercall (map)). Specifically, the reading unit 63 maps the reception virtual storage area corresponding to the transfer destination virtual machine 1 to the first storage area to which the transmission virtual storage area corresponding to the transfer source virtual machine 1 is mapped.

Fifth Embodiment

Next, a fifth embodiment will be described. In a description of the fifth embodiment, a description of the same content as the first embodiment is omitted, and only differences from the first embodiment will be described. In the fifth embodiment, a configuration of a communication system including a control target device will be described.

Figure 20:
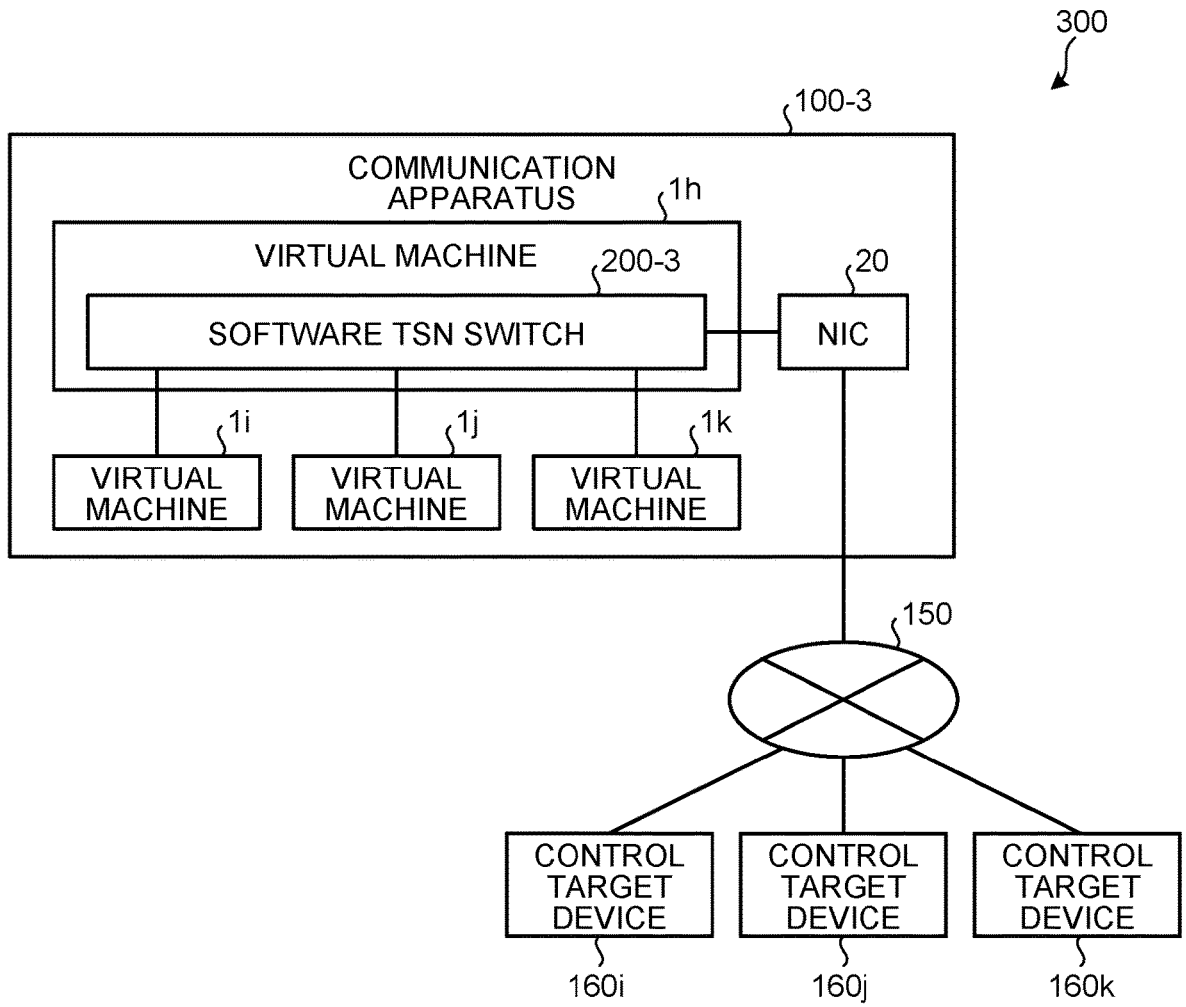
FIG. 20 is a diagram illustrating an example of an apparatus configuration of a communication system according to a fifth embodiment.
Figure 21:
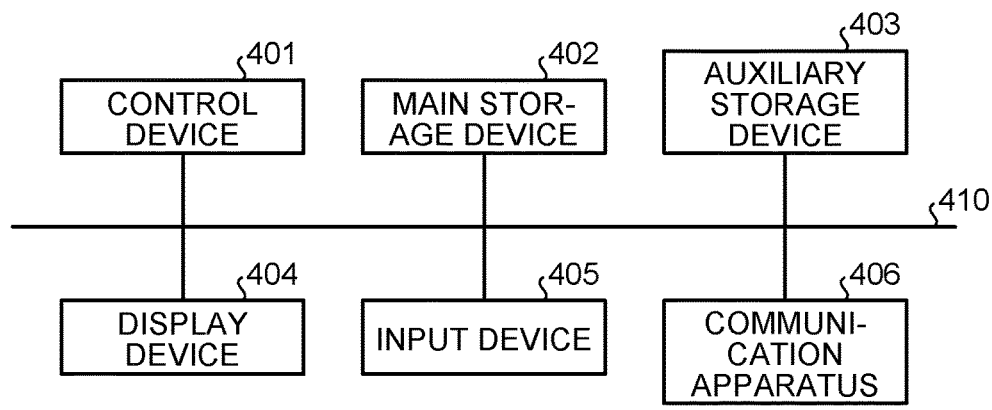
FIG. 21 is a diagram illustrating an example of a hardware configuration of each of the communication apparatuses according to the first to fifth embodiments.

FIG. 20 is a diagram illustrating an example of an apparatus configuration of a communication system 300 according to the fifth embodiment. A communication apparatus 100-3 of the fifth embodiment includes the communication apparatus 100-3, a network 150, and control target devices 160*i* to 160*k*.

The communication apparatus 100-3 includes virtual machines 1*h* to 1*k* and an NIC 20. A software TSN switch 200-3 operates on the virtual machine 1*h*. The virtual machine 1*i* controls the control target device 160*i*. The virtual machine 1*j* controls the control target device 160*j*. The virtual machine 1*k* controls the control target device 160*k*. The NIC 20 is an interface connected to the network 150.

The network 150 is a wired or wireless communication network or a combination of wired and wireless communication networks. The network 150 is, for example, an industrial network, an in-vehicle network, or the like.

The control target devices 160i to 160k are devices controlled by the communication apparatus 100-3. The control target devices 160i to 160k may be any devices such as an edge computer, a robot, a sensor, an actuator, and a belt conveyor.

By operating the communication apparatus 100-3 of the fifth embodiment in such a communication system 300, it is possible to suppress a delay in transfer processing required for real-time communication of the control target devices 160i to 160k.

Finally, an example of a hardware configuration of each of the communication apparatuses 100 to 100-3 according to the first to fifth embodiments will be described.

Example of Hardware Configuration

FIG. 20 is a diagram illustrating an example of a hardware configuration of each of the communication apparatuses 100 to 100-3 according to the first to fifth embodiments.

The communication apparatuses 100 to 100-3 each include a control device 401, a main storage device 402, an auxiliary storage device 403, a display device 404, an input device 405, and a communication IF 406. The control device 401, the main storage device 402, the auxiliary storage device 403, the display device 404, the input device 405, and the communication IF 406 are connected via a bus 410.

The control device 401 executes a program that the main storage device 402 reads from the auxiliary storage device 403. The main storage device 402 is a memory such as a read only memory (ROM) and a random access memory (RAM). The auxiliary storage device 403 is a hard disk drive (HDD), a solid state drive (SSD), a memory card, or the like.

The display device 404 displays display information. The display device 404 is, for example, a liquid crystal display. The input device 405 is an interface for operating a computer made to operate as the communication apparatus 100 (100-2 or 100-3). The input device 405 is, for example, a keyboard or a mouse. Note that the display device 404 and the input device 405 may use a display function and an input function of an external management terminal or the like connectable to the communication apparatuses 100 (100-2 and 100-3).

The communication IF 406 is an interface for performing communication with other devices.

The program executed by the computer is an installable or executable file, is recorded in a computer-readable storage medium such as a CD-ROM, a memory card, a CD-R, or a digital versatile disc (DVD), and is provided as a computer program product.

Further, the program executed by the computer may be stored in a computer connected to a network such as the Internet and may be provided by being downloaded via the network. Alternatively, the program executed by the computer may be provided via a network such as the Internet without being downloaded.

Further, the program executed by the computer may be provided by being incorporated in a ROM or the like in advance.

The program executed by the computer has a module configuration including functional blocks that can also be implemented by a program in the functional configuration (functional blocks) of the communication apparatus 100 (100-2 or 100-3) described above. As the actual hardware, the control device 401 reads the program from a storage medium and executes the program, such that the respective functional blocks are loaded on the main storage device 402. That is, the respective functional blocks are generated on the main storage device 402.

Note that some or all of the functional blocks described above may be implemented by hardware such as an integrated circuit (IC) instead of being implemented by software.

Further, in a case of implementing the respective functions using a plurality of processors, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a memory; and
   one or more processors coupled to the memory and configured to:
      execute a task to notify notification information to a virtual machine as a notification destination via a virtual machine monitor or to store the notification information in the memory after execution of predetermined processing, and
      collectively notify the virtual machine monitor of a plurality of notification information pieces, the plurality of notification information pieces having corresponding individual notification information and being stored in the memory, wherein
   the one or more processors are further configured to:
      estimate a number of notification information pieces generated within a predetermined period based on a number of virtual machines, and
      request the task to notify the virtual machine of the notification information via the virtual machine monitor after the execution of the predetermined processing based on the number of notification information pieces being equal to or less than a threshold value, and request the task to store the notification information in the memory after the execution of the predetermined processing based on the number of notification information pieces being larger than the threshold value.

2. The apparatus according to claim 1, wherein
the one or more processors collectively notify the virtual machine monitor of the plurality of notification information pieces by using one hypercall.

3. The apparatus according to claim 1, wherein
the task includes a plurality of tasks,
the plurality of tasks are periodically executed based on first schedule information indicating an execution order of the plurality of tasks, and
the one or more processors collectively notify the virtual machine monitor of the plurality of notification information pieces stored in the memory by the plurality of tasks executed within one computer execution cycle of the first schedule information.

4. The apparatus according to claim 1, wherein
the one or more processors collectively notify the virtual machine monitor of the plurality of notification information pieces stored in the memory based on the number of notification information pieces being larger than the threshold value.

5. The apparatus according to claim 4, wherein
the virtual machine includes a plurality of virtual machines, and a number of virtual machines operating in the communication apparatus varies.

6. The apparatus according to claim 1, comprising:
an input processing task that executes read processing for a frame transferred from the virtual machine as a transfer source; and
an output processing task that executes write processing for a frame to be transferred to the virtual machine as a transfer destination, wherein
the input processing task stores a read completion notification as the notification information in the memory after execution of the read processing, and
the output processing task stores a write completion notification as the notification information in the memory after execution of the write processing.

7. The apparatus according to claim 6, wherein
the memory further stores a notification control method for the notification information for each virtual machine,
after executing the read processing, the input processing task stores the read completion notification in the memory based on the notification control method corresponding to an interrupt, and does not store the read completion notification in the memory based on the notification control method corresponding to polling, and
after executing the write processing, the output processing task stores the write completion notification in the memory based on the notification control method corresponding to the interrupt, and does not store the write completion notification in the memory based on the notification control method corresponding to the polling.

8. The apparatus according to claim 6, wherein
the input processing task executes the read processing, based on second schedule information defined by IEEE 802.1Qbv, and
the output processing task executes the write processing, based on the second schedule information.

9. A communication system comprising:
a communication apparatus; and
one or more control target devices controlled by one or more virtual machines operating in the communication apparatus, wherein
the communication apparatus includes:
    a memory, and
    one or more processors coupled to the memory and configured to:
        execute a task to notify notification information to the virtual machine as a notification destination via a virtual machine monitor or to store the notification information in the memory after execution of predetermined processing, and
        collectively notify the virtual machine monitor of a plurality of notification information pieces, the plurality of notification information pieces having corresponding individual notification information and being stored in the memory, wherein
the one or more processors are further configured to:
    estimate a number of notification information pieces generated within a predetermined period based on a number of virtual machines, and
    request the task to notify the virtual machine of the notification information via the virtual machine monitor after the execution of the predetermined processing based on the number of notification information pieces being equal to or less than a threshold value, and request the task to store the notification information in the memory after the execution of the predetermined processing based on the number of notification information pieces being larger than the threshold value.

10. A notification method comprising:
executing a task to notify notification information to a virtual machine as a notification destination via a virtual machine monitor or to store the notification information in a memory after execution of predetermined processing; and
collectively notifying the virtual machine monitor of a plurality of notification information pieces, the plurality of notification information pieces having corresponding individual notification information and being stored in the memory, wherein
the method further comprises:
    estimating a number of notification information pieces generated within a predetermined period based on a number of virtual machines; and
    requesting the task to notify the virtual machine of the notification information via the virtual machine monitor after the execution of the predetermined processing based on the number of notification information pieces being equal to or less than a threshold value, and requesting the task to store the notification information in the memory after the execution of the predetermined processing based on the number of notification information pieces being larger than the threshold value.

11. A computer program product comprising a non-transitory computer-readable medium including programmed instructions stored thereon, wherein the instructions, when executed by a computer, cause the computer to perform:
executing a task to notify notification information to a virtual machine as a notification destination via a virtual machine monitor or to store the notification information in a memory after execution of predetermined processing; and
collectively notifying the virtual machine monitor of a plurality of notification information pieces, the plurality of notification information pieces having corresponding individual notification information and being stored in the memory, wherein
the instructions cause the computer to further perform:
    estimating a number of notification information pieces generated within a predetermined period based on a number of virtual machines; and
    requesting the task to notify the virtual machine of the notification information via the virtual machine monitor after the execution of the predetermined processing based on the number of notification information pieces being equal to or less than a threshold value, and requesting the task to store the notification information in the memory after the execution of the predetermined processing based on the number of notification information pieces being larger than the threshold value.

* * * * *